United States Patent
Gilson et al.

(10) Patent No.: US 11,736,405 B2
(45) Date of Patent: Aug. 22, 2023

(54) NETWORK PACKET LATENCY MANAGEMENT

(71) Applicant: Comcast Cable Communications, LLC, Philadelphia, PA (US)

(72) Inventors: Ross Gilson, Philadelphia, PA (US); Benny Pruden, Brownstown, PA (US); Mark Francisco, Clarksburg, NJ (US)

(73) Assignee: Comcast Cable Communications, LLC, Philadelphia, PA (US)

(*) Notice: Subject to any disclaimer, the term of this patent is extended or adjusted under 35 U.S.C. 154(b) by 95 days.

(21) Appl. No.: 15/248,834

(22) Filed: Aug. 26, 2016

(65) Prior Publication Data
US 2017/0063705 A1 Mar. 2, 2017

Related U.S. Application Data

(60) Provisional application No. 62/212,342, filed on Aug. 31, 2015.

(51) Int. Cl.
*H04L 12/841* (2013.01)
*H04L 47/28* (2022.01)
(Continued)

(52) U.S. Cl.
CPC .......... *H04L 47/286* (2013.01); *H04L 41/083* (2013.01); *H04L 43/0852* (2013.01);
(Continued)

(58) Field of Classification Search
CPC .................................................... H04L 41/083
See application file for complete search history.

(56) References Cited

U.S. PATENT DOCUMENTS

| 8,351,327 B1* | 1/2013 | Binns ............... H04L 69/14 370/229 |
| 2002/0150041 A1* | 10/2002 | Reinshmidt ......... H04L 45/22 370/216 |

(Continued)

FOREIGN PATENT DOCUMENTS

| EP | 2624506 A1 | 8/2013 |
| EP | 2760163 A1 | 7/2014 |
| WO | 2006044930 A1 | 4/2006 |

OTHER PUBLICATIONS

Jan. 13, 2017—(EP) Extended Search report—App 16186643.9.
(Continued)

*Primary Examiner* — Nicholas R Taylor
*Assistant Examiner* — Sm Z Islam
(74) *Attorney, Agent, or Firm* — Banner & Witcoff, Ltd.

(57) ABSTRACT

Systems and methods are described herein for managing information transmitted between and/or within communication networks. Aspects discussed herein relate to monitoring and characterizing data flows with network and/or latency parameters, such as a time-to-buffer (TTB) parameter. Latency managers, network components, or other suitable devices operating in a communication network may utilize TTB parameter information as a management mechanism throughout the communication network to negotiate and schedule the delivery of data packets in view of a variety of factors, e.g., network performance, application priority, and the like. Such devices may be further configured to modify network or routing policies based on network performance and latency information obtained from and/or shared by various network components and devices in the communication network.

22 Claims, 6 Drawing Sheets

(51) Int. Cl.
  *H04L 47/283* (2022.01)
  *H04L 43/0852* (2022.01)
  *H04L 41/083* (2022.01)
  *H04L 43/16* (2022.01)
  *H04L 47/32* (2022.01)
  *H04L 43/10* (2022.01)
  *H04L 43/06* (2022.01)
  *H04L 12/26* (2006.01)
  *H04L 12/24* (2006.01)
  *H04L 12/823* (2013.01)

(52) U.S. Cl.
  CPC ............ *H04L 47/283* (2013.01); *H04L 43/06* (2013.01); *H04L 43/10* (2013.01); *H04L 43/16* (2013.01); *H04L 47/32* (2013.01)

(56) References Cited

U.S. PATENT DOCUMENTS

| | | | |
|---|---|---|---|
| 2006/0268713 A1 | 11/2006 | Lundstrom | |
| 2007/0041364 A1* | 2/2007 | Kakadia | H04L 47/10 370/352 |
| 2008/0084900 A1* | 4/2008 | Dunn | H04N 21/23406 375/E7.014 |
| 2008/0298195 A1* | 12/2008 | Kanatake | G11B 7/1267 369/53.36 |
| 2011/0019668 A1* | 1/2011 | Diab | H04L 47/564 370/389 |
| 2011/0058554 A1* | 3/2011 | Jain | H04L 45/00 370/392 |
| 2011/0242972 A1* | 10/2011 | Sebire | H04L 67/06 370/229 |
| 2012/0063339 A1* | 3/2012 | Song | H04L 47/28 370/252 |
| 2013/0142066 A1* | 6/2013 | Yamaguchi | H04L 49/252 370/252 |
| 2014/0016464 A1* | 1/2014 | Shirazipour | H04L 47/26 370/235 |
| 2014/0204743 A1* | 7/2014 | Garcia | H04L 47/18 370/231 |
| 2014/0258618 A1* | 9/2014 | Novakovsky | G06F 12/0802 711/118 |
| 2015/0295835 A1* | 10/2015 | Yang | H04L 47/18 370/235 |
| 2016/0262041 A1* | 9/2016 | Rönneke | H04W 72/042 |

OTHER PUBLICATIONS

Pearson, Levi. "Stream Reservation Protocol," AVnu Alliance Best Practices, Nov. 3, 2014, 21 pages.
Jul. 10, 2018—European Office Action—EP16186643.9.
Jun. 7, 2019—European Office Action—EP 16186643.9.
May 13, 2020—European Office Action—EP 16186643.9.
Oct. 13, 2022—CA Office Action—CA App. No. 2,940,754.

\* cited by examiner

NETWORK PACKET LATENCY MANAGEMENT

CROSS REFERENCE TO RELATED APPLICATIONS

This application claims the benefit of, and priority to, U.S. Provisional Patent No. 62/212,342 filed Aug. 31, 2015, titled "Network Management," the contents of which are expressly incorporated herein by reference in their entirety for any and all non-limiting purposes.

BACKGROUND

Current methods of network management emphasize the maximization of throughput for the purpose of saving bandwidth and/or other network resources. However, such methods may emphasize optimal throughput at the cost of increased latency within a communication network. That said, the amount of bandwidth made available to content consumers has been and may continue to grow over time, and could eventually outpace the content services utilizing said bandwidth. Thus, there remains an ever-present need for improved methods of network management that optimizes throughput while also reducing latency within a communication network.

SUMMARY

The following summary is for illustrative purposes only, and is not intended to limit or constrain the detailed description. The following summary merely presents various described aspects in a simplified form as a prelude to the more detailed description provided below.

Various different network, service, and/or content applications having different latency sensitivities, jitter sensitivities, and bandwidth requirements may be located throughout a communication network. An entity operating within and/or operatively connected to the network, such as a latency manager and/or network device, may be configured to gather information from the communication network and/or a service provider to determine which applications have the most impact on customer experience and network performance. The entity may be configured to request network and/or performance information from a plurality of network devices (and/or applications) operating within the communication network.

The entity may also serve as a latency load balancer within the communication network to facilitate the efficient transfer of data packets within the network. For example, the entity may utilize a trace-route (and/or other suitable network mechanism) to determine a plurality of potential network communication paths for one or more data packets to traverse when traveling across the network from a source network to an end point. The trace-route may provide feedback to the entity regarding the plurality of potential communication paths for the data packet, as well as network performance and latency information for each path in the plurality of potential communication paths. The entity may utilize information obtained by the trace-route to determine an optimal path for a data packet, such that the data packet may timely and successfully arrive at its final or intended destination.

The entity may also be configured to determine whether a particular data packet can be successfully delivered based on data within a time-to-buffer (TTB) field/parameter of the data packet, which may indicate an amount of time remaining for the data packet to be delivered to its final (and/or intended) destination. Additionally or alternatively, data packets transmitted over the communication network may include a max jitter ("MJ") field/parameter, which may include information indicating a maximum amount of jitter permissible for transmitting one or more jitter-sensitive data packets successfully to their final destination. Utilizing information with a latency profile or network report, a source application, a latency manager, a network device, or any other suitable computing device operating within the network may predict whether a data packet can reach its final or intended destination.

Accordingly, using network performance and/or latency information as network management mechanisms for data packets can assist network devices (and/or applications, latency managers, etc.) in communicating and negotiating appropriate delivery policies and time frames to more efficiently transfer data packets over a communication network in a timely manner. Source applications, latency managers, client devices and/or other suitable computing devices may utilize information stored in latency profiles and network reports to anticipate the network resources, bandwidth, and time frames required to successfully transmit data packets within the communication network, and may also dynamically modify routing policies by reprioritizing the transmission of certain data packets, for example by changing/adjusting the respective TTB data for buffered data packets. Each of the various network devices in the communication network may adapt to the adjusted TTB value (or other parameters) of data packets transmitted over the communication network in order to implement updated network routing policy and to ensure successful prioritization and delivery of data packets.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

Figure 1:
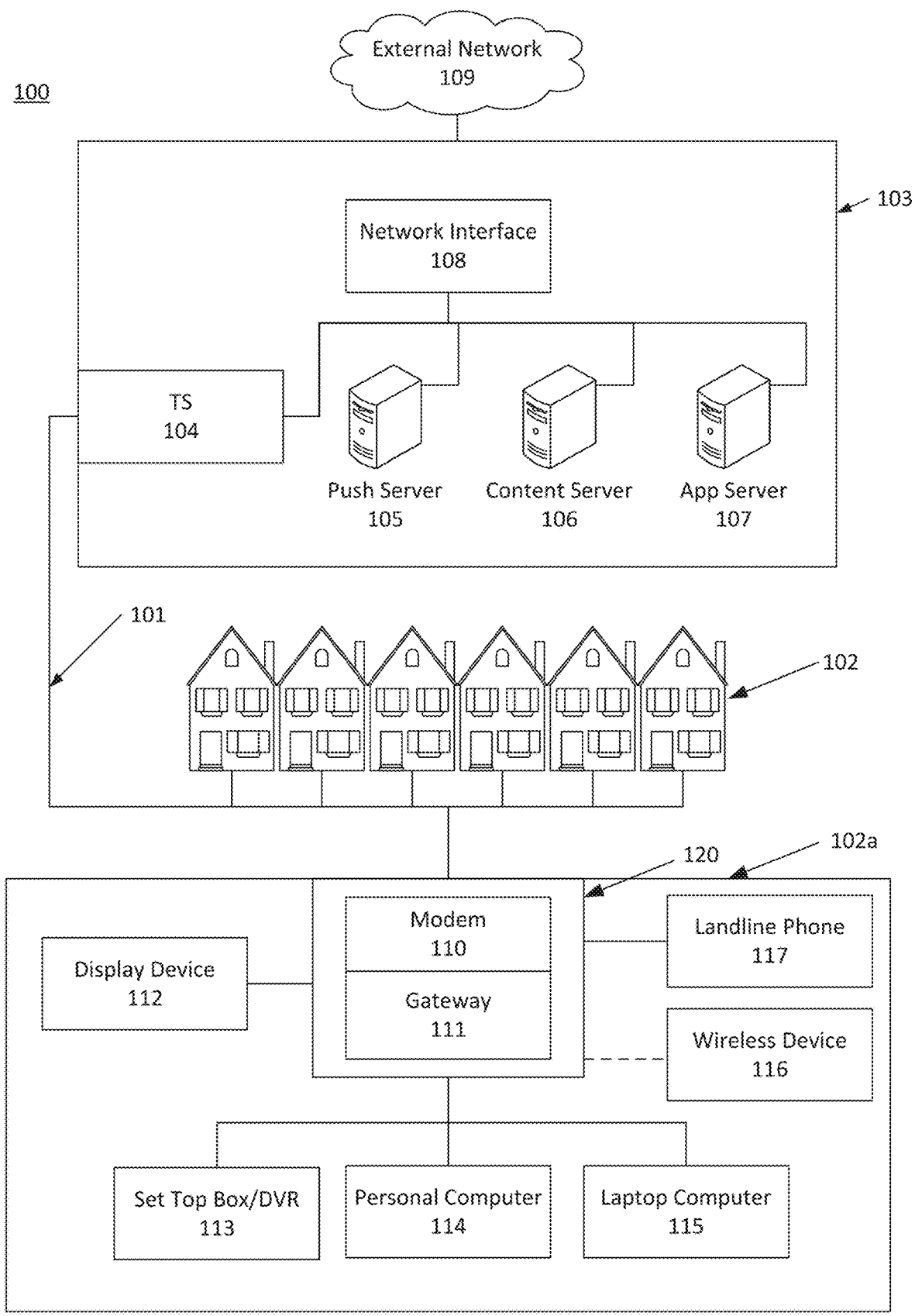
FIG. 1 shows an example communication network on which various features described herein may be used.

In the following description of the various embodiments, reference is made to the accompanying drawings identified above, which form a part hereof, and in which is shown by way of illustration various embodiments in which various aspects of the disclosure may be practiced. Other embodiments may be utilized, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

In some embodiments, network performance and latency information may be stored in a network latency profile and/or network report that may be utilized by various network devices (e.g., network components, network nodes, etc.) to determine an amount of time required for one or more data packets to reach their respective final destinations. The network performance and latency information may also be utilized to determine an amount of time it takes a data packet to travel between one or more network devices along a communication path of the data packet toward a final (and/or intended) destination. Utilizing this information, a source application, latency manager, and/or network device may predict whether a data packet may successfully reach its final or intended destination based at least in part on the TTB information included within the data packet. Additionally or alternatively information indicating an amount of time since the data packet was (and/or is expected to be) dropped and/or how many additional hops the data packet must traverse prior to reaching its final destination may be utilized to determine whether a data packet can be successfully delivered.

An entity (e.g., a computing device, latency manager, network device, etc.) may be configured to dynamically generate or update latency profiles and/or network reports based on network performance and latency information obtained from network devices within a communication network. For example, in some instances, one or more applications and/or network devices needing to utilize network resources may transmit resource requests to the entity, which may be subsequently stored in a relevant latency profile and/or network report. In some embodiments, the entity may utilize an authentication protocol to authenticate a request transmitted by an application requesting information and/or attempting to communicate with the entity. A variety of known authentication protocols may be utilized by the entity without departing from the scope of the present disclosure.

The entity may comprise a network device, such as a router, or any other suitable network node or network component. Additionally or alternatively, the entity may comprise a latency manager. The latency manager may comprise a computing device or a component thereof. In another of these embodiments, the latency manager may be abstracted to an application program interface (API) utilized by a network administrator, application service provider, and/or other entity. The latency manager may be located at the edge of one or more communication networks. In such examples, the latency manager may be specifically configured to handle critical network tasks that may require an expedient response. Additionally or alternatively, the latency manager may be implemented in a cloud-based entity and/or a cloud computing environment.

Data packets transmitted over the communication network may be configured to include a time-to-buffer ("TTB") field (and/or parameter), which may include information indicating an amount of time remaining for a data packet to be delivered to its final (and/or intended) destination. One or more network components (e.g., network devices, nodes, routers, etc.) in the communication network that may receive and/or transmit a data packet along a communication path in the network may be configured to utilize information stored in the TTB field/parameter of a data packet to determine and/or prioritize the scheduled transmission of the data packet. For example, in some embodiments, a network device may prioritize one or more data packets based on a network and/or routing policy, such as transmitting data packets in order of lowest TTB value. As another example, a network device may prioritize one or more data packets based on the priority assigned to a network application and its associated data flow.

A network device may be configured to determine whether a data packet can be successfully delivered to its final and/or intended destination based on a TTB field in the data packet. Additionally or alternatively, the network device may utilize latency information collected from latency profiles (and/or network reports) indicating an amount of latency between the network device and a final destination of the data packet. In some of these embodiments, if the network device determines that a data packet cannot be successfully delivered within the time indicated by the TTB field, the network device may be configured to implement various types of curative measures without departing from the scope of the present disclosure, such as dropping the data packet, transmitting a network communication to other network devices, transmitting a network communication to latency managers, transmitting a network communication to the source application (e.g., the application that generated the data packet at issue), transmitting a network communication to the source network device, adjusting the TTB values of one or more other data packets, and the like.

A network device may drop or discard data packets that are outdated and/or have satisfied a threshold delivery time period (e.g., if a data packet buffer in the network device becomes full and/or a threshold time period passes). In the instance that a data packet is dropped (and/or is expected to be dropped), the source application and/or the network device that drops (and/or expects to drop) the data packet may be required to wait a certain amount of time before receiving a timeout error or other message indicating an unsuccessful delivery of the data packet. The source application (and/or network device) may subsequently attempt to retransmit the data packet. However, the retransmission of the data packet may cause the system to utilize network bandwidth and resources that may have otherwise been used to transmit one or more different data packets within the network. Accordingly, as noted above, utilizing network communications to obtain and report network performance and latency information may facilitate the efficient deployment of such information throughout the network.

As noted above, certain embodiments are discussed herein that relate to exchanging latency and network information between network devices. Before discussing these concepts in greater detail, however, several examples of computing devices and system architectures that may be used in implementing and/or otherwise providing various aspects of the disclosure will first be discussed with respect to FIGS. 1 and 2.

FIG. 1 shows an example communication network 100 on which many of the various features described herein may be implemented. The communication network 100 may be any type of information distribution network, such as satellite, telephone, cellular, wireless, etc. One example may be an optical fiber network, a coaxial cable network, or a hybrid fiber/coax distribution network. Such communication networks 100 use a series of interconnected communication links 101 (e.g., coaxial cables, optical fibers, wireless, etc.) to connect the various premises 102 (e.g., businesses, homes, consumer dwellings, etc.) to a local office or headend 103. The local office 103 may transmit downstream information signals onto the communication links 101, and each of the various premises 102 may have a receiver used to receive and process those signals.

There may be one communication link originating from the local office 103, and it may be split a number of times to distribute the signal to the various premises 102 in the vicinity (which may be many miles) of the local office 103. The communication links 101 may include components not illustrated, such as splitters, filters, amplifiers, etc. to help convey the signal clearly, but in general each split introduces a bit of signal degradation. Portions of the communication links 101 may also be implemented with fiber-optic cable, while other portions may be implemented with coaxial cable, other lines, or wireless communication paths.

The local office 103 may include an interface 104, such as a termination system (TS) interface 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of computing devices 105-107, such as servers, that may be configured to perform various functions. For example, the local office 103 may include a push notification computing device 105. The push notification device 105 may generate push notifications to deliver data and/or commands to the various premises 102 in the network (or more specifically, to the devices in the various premises 102 that are configured to detect such notifications). The local office 103 may also include a content server computing device 106. The content device 106 may be one or more computing devices that are configured to provide content to users at their premises. This content may be, for example, video on demand movies, television programs, songs, text listings, etc. The content server computing device 106 may include software to validate user identities and entitlements, to locate and retrieve requested content, to encrypt the content, and to initiate delivery (e.g., streaming) of the content to the requesting user(s) and/or device(s). Indeed, any of the hardware elements described herein may be implemented as software running on a computing device.

The local office 103 may also include one or more application server computing devices 107. The application server 107 may be a computing device configured to offer any desired service, and may run various languages and operating systems (e.g., servlets and JSP pages running on Tomcat/MySQL, OSX, BSD, Ubuntu, Red Hat, HTML5, JavaScript, AJAX and COMET). For example, an application server may be responsible for collecting television program listings information and generating a data download for electronic program guide listings. The application server may be responsible for monitoring user viewing habits and collecting that information for use in selecting advertisements. The application server may also be responsible for formatting and inserting advertisements in a video stream being transmitted to the various premises 102. Although shown separately, one of ordinary skill in the art will appreciate that the push notification device 105, content server computing device 106, and the application server 107 may be combined. Further, here the push notification device 105, the content server computing device 106, and the application server 107 are shown generally, and it will be understood that they may each contain memory storing computer executable instructions to cause a processor to perform steps described herein and/or memory for storing data.

The example premise 102a, such as a home, may include an interface 120. The interface 120 may include any communication circuitry needed to allow a device to communicate on one or more communication links 101 with other devices in the network. For example, the interface 120 may include the modem 110, which may include transmitters and receivers used to communicate on the communication links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may be a set-top box (STB), digital video recorder (DVR), computer server, or any other desired computing device. The gateway interface device 111 may also include (not shown) local network interfaces to provide communication signals to requesting entities/devices in the premises 102a, such as the display devices 112 (e.g., televisions), STB and/or DVR 113, the personal computers 114, the laptop computers 115, the wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), the landline phones 117 (e.g. Voice over Internet Protocol—VoIP phones), the tablet computing devices 118, the mobile phones 119, and any other desired devices. Examples of the local network interfaces include Multimedia over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
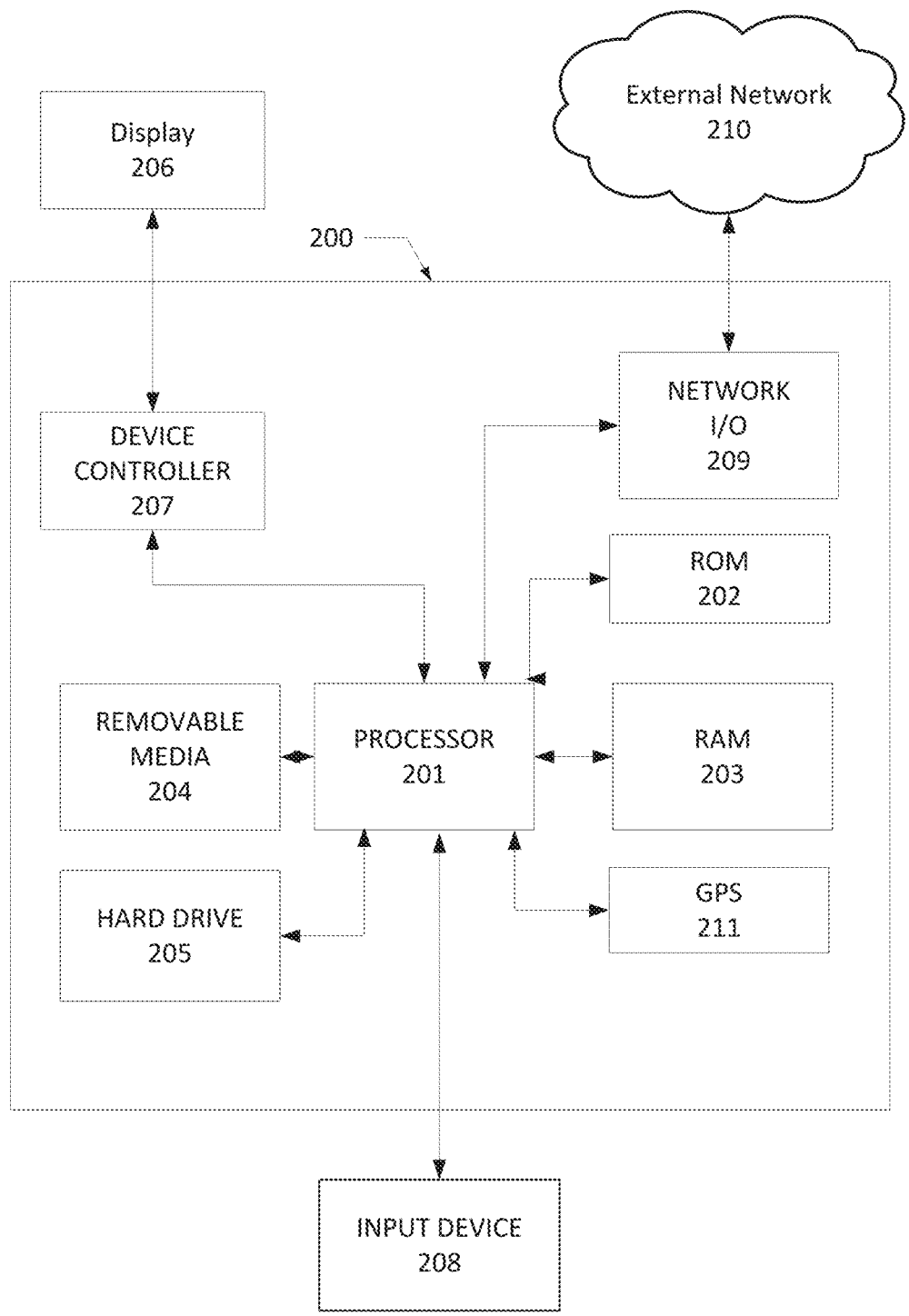
FIG. 2 shows an example computing device that can be used to implement any of the methods, servers, entities, and computing devices described herein.

FIG. 2 shows general hardware elements that may be used to implement any of the various computing devices discussed herein. The computing device 200 may include one or more processors 201, which may execute instructions the random access memory (RAM) 203, the removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may also include a security processor (not shown), which may execute instructions of a one or more computer programs to monitor the processes executing on the processor 201 and any process that requests access to any hardware and/or software components of the computing device 200 (e.g., ROM 202, RAM 203, the removable media 204, the hard drive 205, the device controller 207, a network circuit 209, the GPS 211, etc.). The computing device 200 may include one or more output devices, such as the display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as the network e circuit 209 may be a wired interface, wireless interface, or a combination of the two. In some embodiments, the network circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which may be configured to receive and process global positioning signals and determine, with possible assistance from an external server and antenna, a geographic position of the device.

The example in FIG. 2 is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity may a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
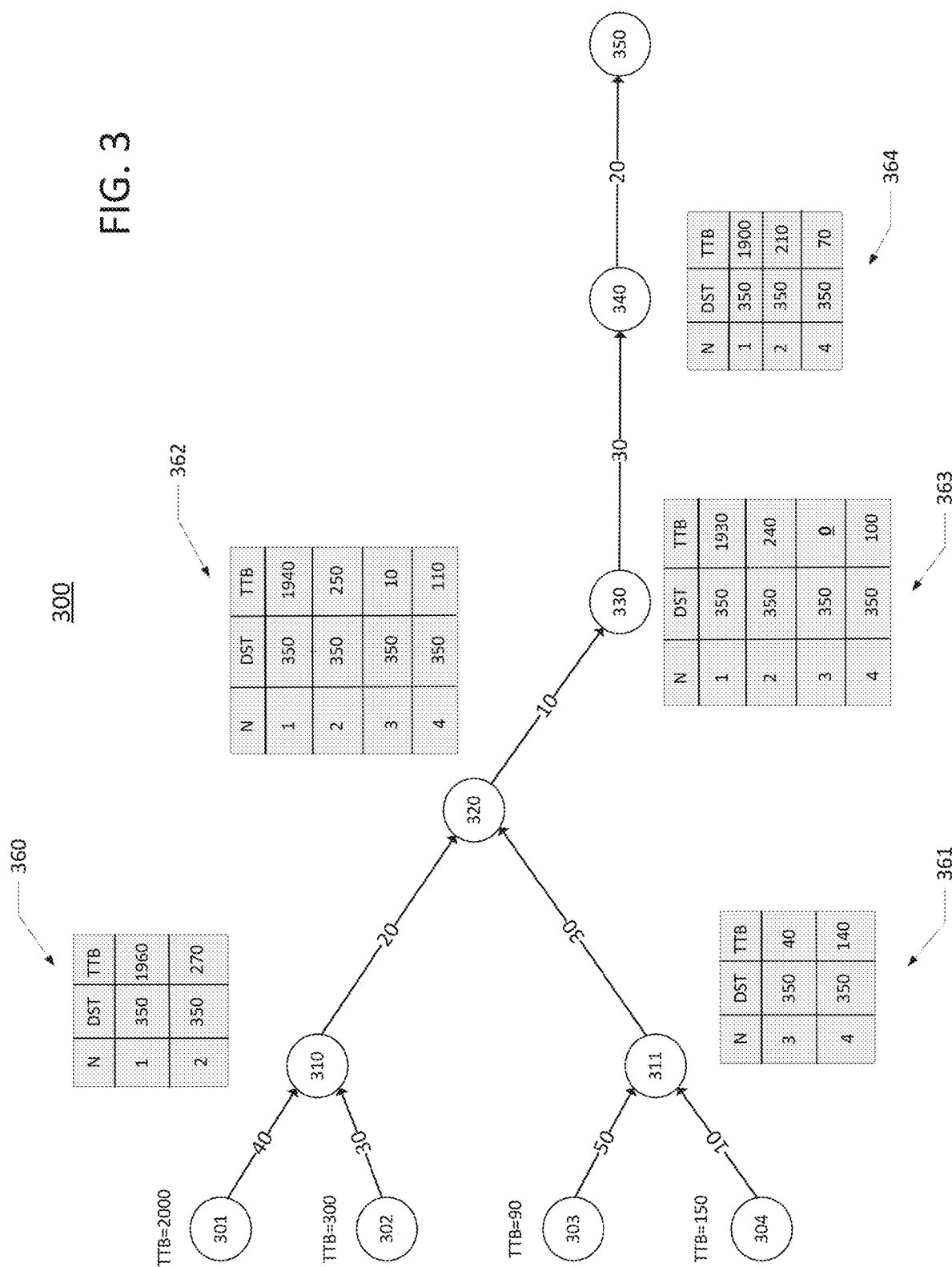
FIG. 3 shows an illustrative communication network path and latency information in which various features described herein may be used.

Having discussed several examples of the computing system architecture that may be used in providing and/or implementing various aspects of the disclosure, a number of embodiments will now be discussed in greater detail. FIG. 3 shows an example communication network path on which many of the various features described herein may be implemented. The depicted communication network (e.g., the network 300) may be any type of information distribution network. As shown in FIG. 3, the network 300 may comprise a networked environment supporting connections to one or more network devices, such as network components 301-304. The network components 301-304 may comprise a router, or other suitable network node or network device that may include many (and/or all) of the elements described above with respect to the computing device 200 (FIG. 2). It will be appreciated that the network connections shown are illustrative and other means of establishing a communications link (or communication path) between devices on a communication network may be used. Additionally or alternatively, the network components 301-304 may be any device capable of and/or configured to receive and transmit data packets or other information over a communication network. As shown in FIG. 3, a computing device, such as the network component 301, may transmit information (e.g., one or more data packets) along a network communication path toward an intended or final destination. The data packets transmitted over the communication network may carry information on behalf of one or more applications (e.g., content application, service application, etc.) utilizing by the communication network to transmit information, for example, a voice-over IP call. Data transmitted from a network component may experience some amount of network latency before arriving at a destination node in the communication network. As shown in FIG. 3, for example, data transmitted from the network component 301 to the network component 310 may experience 40 ms of latency. In this example, the amount of latency over the communication link between the network components 301 and 310 may be static.

In some embodiments, an entity, such as a latency manager, network component or other suitable computing device, may be operatively in communication with (and/or connected to) one or more other devices in the communication network. The entity may be configured to determine latency between a plurality of network components within the network 300. The amount of latency experienced over a communication path may vary between any two network components within the communication network. Additionally or alternatively, the amount of latency may vary in the direction of communication between any two network components within the communication network. As discussed above, the entity may periodically determine a static amount of latency time between various nodes in the communication network. Additionally or alternatively, the entity may be configured to determine actual latency between two network components.

Various techniques for determining latency may be utilized by the entity without departing from the scope of the present disclosure, such as by calculating an amount of time for a ping to travel from one network component to the next, by inspecting packet departure and arrival times between two network components, and the like. A network component may be configured to retrieve data from system clocks to determine the latency associated with a particular communication path (and/or portion thereof) traversed by a data packet. Alternatively or additionally, when two network components are measuring and/or determining latency, this is largely a function of how much data traffic is on the communication path between the two network components.

For instance, if a 1 mbps communication path has limited to no data traffic, the latency associated with the first communication path may be considered acceptable by an application. Along the same lines, if a 10 mbps communication path has roughly 50% utilization, the amount of latency associated with this second communication path may be similar to that of the first communication path. However, the incremental levels of latency associated with the first and second communication paths may differ as additional data traffic is sent along the respective communication paths. For example, with respect to the 1 mbps communication path, adding an amount of additional data traffic (e.g., 900 kbps of data) to the first communication path may cause the first communication path to near its maximum data throughput. Accordingly, for certain time intervals, data packets may need to be sent along the first communication path faster than permissible by a network component. These short periods of time may add latency to the first communication path, and may further cause the network component to not transmit (and/or retransmit) one or more data packets to during the time intervals.

However, with respect to the 10 mbps connection having a 50% utilization, adding an amount of additional data traffic (e.g., 900 kbps of data) to the second communication path may not affect the latency of the second communication path as compared to the first communication path. Accordingly, a computing device (e.g., latency manager, network component, etc.) may utilize a metric indicting a ratio of current throughput (e.g., max throughout, average throughput, instantaneous throughput, etc.) to communication path speed (e.g., max speed, average speed, instantaneous speed, etc.) to gauge an incremental amount of latency incurred by adding a threshold amount of data traffic to the communication path.

$$\text{Percentage}(\%) \text{ of Throughput Utilized} = \frac{(\text{current average or max throughout})}{(\text{max communication path speed})}$$

$$\text{New Predicted Percentage }(\%)\text{ of Throughtput Utilized} = \frac{(\text{current average or max throughput}) + (\text{threshold amount of traffic required})}{(\text{max communication path speed})}$$

Figure 5:
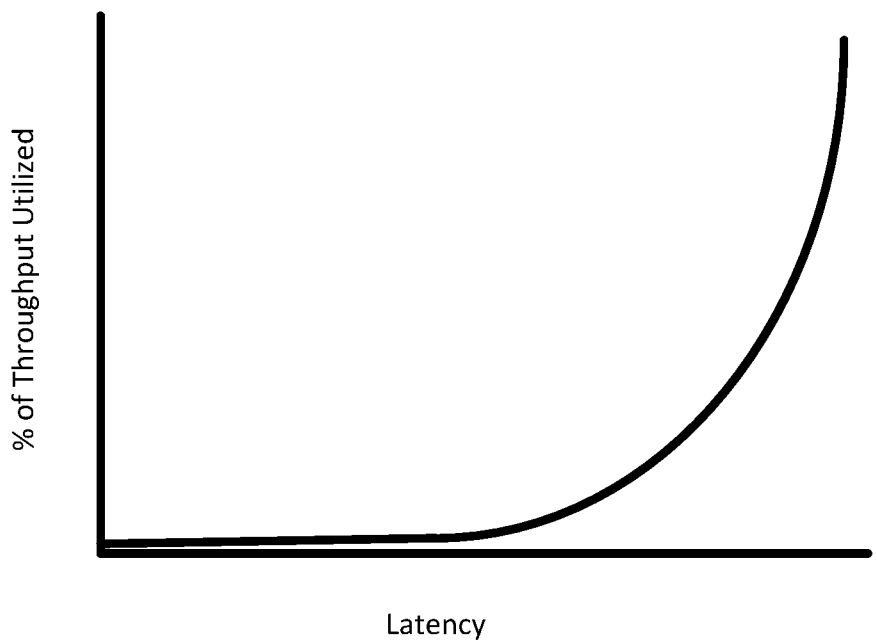
FIG. 5 shows a graph illustrating latency as compared to a performance metric corresponding to a percentage of throughput utilized for a communication path.

FIG. 5 shows an exemplary graph that may be derived and/or utilized by a computing device as described herein to gauge latency vs. a performance metric corresponding to a percentage (%) of throughput utilized for a communication path in the communication network. Over time, the computing device (e.g., network component, latency manger, etc.) may monitor the percentage (%) of throughput utilized for a communication path as compared to latency associated with that communication path. The computing device may be configured to store this information in memory or any other suitable data storage over certain threshold time periods for a plurality of communication paths in the communication network. Any suitable time period may be utilized without departing from the scope of the present disclosure, such as 1 minute, 1 day, 1 month, 1 year, and the like. In some embodiments, utilizing this stored latency information, the computing device may be configured to estimate or predict how latency on a particular communication path may be affected by new (and/or additional) data traffic being added to the communication path. In other embodiments, a computing device (e.g., a network component) may utilize the stored latency information (e.g., the information depicted in Graph 1 of FIG. 5) to decide whether (and/or when) to send data traffic over certain communication paths in the network.

As will be discussed in more detail below, in some embodiments, an entity (e.g., latency manager) may serve as a latency load balancer within a communication network to determine and/or implement routing policy within the network, and to facilitate the transfer of data packets based on obtained network performance and latency information. A variety of suitable network mechanisms may be utilized by the entity to determine a plurality of prospective communication paths for a data packet without departing from the scope of the present disclosure, such as trace-routes, other data packets, exterior gateway routing protocols, interior gateway routing protocols, and the like. For example, the entity may utilize a trace-route to determine a plurality of prospective communication paths for a data packet when traveling within the network from a source network component to an intended destination or end point. The trace-route may provide feedback information to the entity regarding the plurality of potential communication paths for the data packet, as well as network performance and latency information for each prospective path that the data packet may take.

In some embodiments, the entity may transmit one or more trace-routes (and/or data packets) to a plurality of end points in the network to generate feedback information regarding the plurality of potential communication paths for a data packet and to determine an amount of latency associated with the plurality of potential communication paths. In some of these embodiments, the trace-route (and/or data packet) may transmit a network communication back to the entity indicating an amount of latency associated with a communication path traversed by the trace-route. Intermediary network components along the communication path traversed by the trace-route may receive the network communication and update network performance and latency information stored in the network communication. As will be discussed in more detail below, the intermediary network components may generate communication reference tables comprising the information collected/stored by network communications, and further, the intermediary network components may be configured to store such information in a database and/or other suitable storage means.

The entity may utilize information obtained by the trace-route, the data packet, and/or other suitable network mechanisms to determine an optimal path for a data packet to timely arrive at a final or intended destination. In some examples, if the entity determines that there are a specified number of prospective communication paths that a data packet may take to reach a destination, the entity may transmit an instance (or copy) of a data packet along each prospective communication path to determine the optimal route for the packet. This may also ensure that at least one instance of the data packet arrives at the intended or final destination. Accordingly, in some embodiments, for higher priority data packets which may require lower latency, the entity may transmit multiple instances of a data packet along various prospective communications paths in a network. In the instance that one of the data packets reaches its intended destination, the entity may cause the remaining instances of the data packet to be dropped or discarded. In some embodiments, the entity may store in memory (or any other suitable data storage) the communication path taken by the successfully transmitted data packet, and may associate this identified path with the final destination or end point of the data packet. Additionally or alternatively, the entity may identify the various network components that forwarded the data packet when traversing the identified communication path. For example, the entity may identify one or more network devices that forwarded the data packet when traversing the identified communication path. As such, the entity may send subsequent data packets intended for a same or similar destination along the identified communication path.

A data field within one or more data packets transmitted across network 300 may be utilized to enhance network performance and management. For example, data packets generated during an application session may be configured to include a time-to-buffer ("TTB") field. The application associated with the data packet (e.g., the source application) may include (and/or assign) TTB data within a field/parameter of a data packet.

Additionally or alternatively, the network component that first transmits a data packet (e.g., a source network component) may be configured to include TTB data within a parameter/field (e.g., TTB field) of a data packet prior to transmission. In other embodiments, network components (e.g., network devices, network nodes, routers, etc.) may be configured to adjust or modify the value within a TTB field of data packets that have been received by the network component. For example, as depicted in FIG. 3, the network component 301 has assigned a first data packet (i.e., n=1) a TTB value of 2000 ms, a destination node (e.g., the network component 350), and the latency along the communication path from the network component 301 to the next network component (i.e., the network component 310). In this example the latency along the communication path from the network component 301 to the network component 310 is 40 ms. In this example, after the first data packet has been received at the network component 310, the network component may modify the first data packet by decrementing the TTB value based on the amount of latency experienced by the data packet along the communication path from the network component 301 to the network component 310. In this example, the data packet experienced 40 ms of latency and thus the TTB value of the first data packet is decremented by the network component 310 from 2000 to 1960 ms, as shown in table 360 (i.e., element 360). As another example, the network component 310 may decrement the TTB value of a second data packet (i.e., n=2) transmitted from the network component 302 having an intended or final destination corresponding to the network component 350. Referring to the example in FIG. 3, the TTB value of the second data packet may be decremented by the network component 310 from 300 ms to 270 ms given that the second data packet experienced 30 ms of latency along the communication path from the network component 302 to the network component 310. In some embodiments, a network component may decrement the TTB value of a data packet prior to transmitting the data packet to another destination. Additionally or alternatively, the network component may decrement the TTB value of the data packet based in part on an amount of time the data packet is buffered at (and/or remains at) the network component prior to transmission.

As further depicted in FIG. 3, the network component 303 has assigned a third data packet (i.e., n=3) a TTB value of 90 ms, and a destination node corresponding to network component 350, while the network component 304 has assigned a fourth data packet (i.e., n=4) a TTB value of 150 ms, and a destination node corresponding to the network component 350. After receiving the third data packet, the network component 311 may be configured to modify the third data packet by decrementing a value within the TTB parameter/field of the data packet from 90 ms to 40 ms, as shown in the table 360. Similarly, after the fourth data packet is received, the network component 311 may be configured to modify the fourth data packet by decrementing a value within the TTB field/parameter of the fourth data packet from 150 ms to 140 ms. Additionally or alternatively, a network component may decrement the TTB value of a data packet prior to transmitting the data packet based on an amount of time the data packet is buffered at (and/or remains at) the network component prior to transmission.

In some embodiments, a network component may inspect a time-to-live ("TTL") field (or other suitable fields) of a data packet to measure a number of hops permitted for and/or have been completed by the data packet. A client device (and/or other suitable computing device) may indicate a delivery time frame for one or more data packets generated during (and/or associated with) an application session. In some embodiments, the client device may include information within a data field of a data packet indicating a "deliver by time period" for transmitting the data packet or a life expectancy of the data packet (e.g., a TTB parameter). In some embodiments, upon expiration of the deliver by time period (e.g., when the data packet timed-out), a network component (and/or application) may no longer attempt to transmit the data packet to a final and/or intended destination.

In some instances, a network application may not be largely affected by small amounts of latency, but can be affected by small amounts of jitter (e.g., a variation in the delay of received data packets). Data packets generated during an application session may be configured to include a max jitter ("MJ") field or parameter therein. In some embodiments, a data packet may be configured to store data indicating a maximum amount of jitter permissible for the data packet to be successfully transmitted over the network. Additionally or alternatively, the application may assign one or more data packets a unique identifier (ID), such as jitter ID) to indicate whether a data packet is associated with a particular data flow. Accordingly data packets containing the same or similar jitter ID may be recognized by other computing devices as being associated with a specified application and/or data flow.

As discussed above, the MJ parameter may indicate a maximum amount of jitter permissible for one or more data packets to be successfully transmitted across the network. The MJ parameter may also include data identifying the jitter ID for the data packet. Like the TTB parameter discussed above, by tagging and/or assigning data fields/parameters of a data packet with the MJ parameter and jitter ID, network components (and/or other computing devices) operating in the network can utilize MJ parameter data and jitter IDs as network mechanisms to successfully and efficiently transfer jitter-sensitive data traffic across the network. For example, a network component (e.g., network device, network node, router, etc.) may be configured to queue data packets having the same or similar jitter ID in its respective buffer such that the jitter-sensitive data packets (e.g., data packets associated with a voice-over-IP (VOIP) call) are not transmitted more than a threshold amount of time (e.g., ms) apart. Additionally or alternatively, even if data packets are transmitted via different communication paths, by associating a sequence number with a specified data flow, a network component that detects half of the data traffic can still determine the maximum amount of time before each data packet associated with the data flow should be transmitted. For example, the network component may determine the maximum amount of time before each data packet should be transmitted by multiplying a max jitter time by the sequence number increase since the last data packet. The application (and/or network component) that generated the data packet (e.g., the source application) may include MJ data within the generated data packet. In other embodiments, network components (e.g., network devices, network nodes, routers, etc.) may be configured to adjust and/or modify the value within an MJ parameter.

A network component may utilize a request/response mechanism to determine whether a particular communication path within the network supports a requested (and/or necessary) latency for transmitting one or more data packets. In some examples, where a transmitting network component is configured to choose the communication path that a data packet may take in the network, the entity may be configured to utilize a request/response mechanism prior to beginning the transmission of information in order to identify and/or select an optimal communication path to transmit the information. As noted above, and as will be discussed in more detail below, the entity may be configured to test out different communication paths for a data packet to take within the network, and select the communication path that is most acceptable to the underlying application and/or content service.

For example, if the entity (e.g., latency manager) detects that there is a poor user experience with a "voice-over-IP" (VOIP) call above 150 ms, the entity may cause a network component to first transmit a data packet (e.g., a data packet transmitted during a typical VOIP call) to a desired destination (e.g. destination node) in the network. The entity may be configured to determine whether the data packet arrives at the desired destination within a threshold time period (e.g., the 150 ms timeframe). In some instances, the entity may cause multiple data packets to be transmitted over a plurality of different communication paths within the network in order to gauge the number and/or percentage of data packets that can reach their (respective) intended destination within the specified time fame (e.g., 150 ms). Utilizing a request-response mechanism, such as the one described above, may allow the sender to determine, prior to transmitting any information, whether it is even worth attempting the requested communication (e.g., VOIP call).

In other examples, where the route or communication path of a data packet is static, the entity may not utilize the request/response mechanism prior to beginning the transmission of information. Rather, the entity may determine which data packets to transmit based on their respective TTB values and/or the threshold latency acceptable for an application. Accordingly, if the entity detects (and/or receives) communications indicating that a TTB value has expired (and/or has been exceeded) for one or more data packets associated with a particular application (e.g., a VOIP call), then the entity can determine whether the data packets associated with the particular application are not being delivered within an acceptable time frame. As will be discussed in more detail below, after making such a determination, the entity may be configured to implement curative measures, such as ceasing further attempts to transmit the data traffic for a predetermine period of time. Any suitable time period may be utilized without departing from the scope of the present disclosure, such as 10 ms, 100 ms, 1 s, and the like.

As will be discussed in more detail below, after the expiration of a deliver-by time period for a data packet (e.g., after expiration of the TTB value for a data packet), a network communication (e.g., internet control message protocol (ICMP) communication, timeout message, error message, etc.) may be transmitted to another computing device, such as a source network component, latency manager, and the like. In some of these embodiments, the computing device may assign a deliver-by time period for a data packet. The computing device may utilize information indicating a deliver by time period within a data packet to determine transmission priorities for data packets transmitted over the communication network. In other embodiments, if a data packet times-out (and/or expires) during transit to a desired destination, the computing device may inspect a network communication associated with the data packet timeout (e.g., ICMP message, timeout message, etc.). For example, the computing device may be configured to determine (and/or correlate) a number of data packets that were transmitted over a communication path, with the number of data packets that expired in transit. Alternatively or additionally, if a threshold number (and/or percentage) of data packets transmitted over the communication path expire, the computing device may be configured to stop sending data packets via that particular communication path for a threshold time period. Any suitable time period may be utilized without departing from the scope of the present disclosure, such as 10 ms, 100 ms, 1 s, and the like.

In still other embodiments, after receiving timeout and/or expiration indications for one or more data packets, the computing device (e.g., latency manager, network component, etc.) may implement a variety of curative measures. In some of these embodiments, the computing device may cause the source network component to perform one or more actions in response to the dropping or discarding of the expired data packet or data packet timeout. For example, in one embodiment, a latency manager may cause the source network component to determine a different communication path for the data packet or other data packets. The latency manager may identify the various network components and/or routes that the data packet may traverse along its path to the intended destination or end point.

In other embodiments, the computing device may cause the source network component to adjust the bandwidth and/or resources provided to other network components (and/or data packets) to ensure the recently expired data packet (or application associated therewith) may receive higher priority for subsequent data packet transmissions. For example, the latency manager may lower the priority of other data packet (and/or associated applications) when redistributing network resources and reprioritizing data packets. In some embodiments, the computing device may be configured to adjust the priority assigned to applications utilizing the network. Additionally or alternatively, the computing device may be configured to adjust the priority assigned to data associated with one or more applications utilizing the network. In other embodiments, the computing device may change or adjust the network policy and/or communication path for one or more data packets (and/or groups of data packets) to accommodate a prioritized data packet and/or data packets associated with a prioritized application. For example, the latency manager may deprioritize data packets transmitted by (and/or associated with) a specific network application or service (e.g., a lower priority application or service) for a threshold period of time in order to accommodate higher priority data packets associated with other services or applications. As another example, the latency manager may delay lower priority data packets for the purpose of redistributing network resources (e.g., bandwidth) to higher priority data packets.

In some embodiments, one or more computing devices may be configured to communicate with a content application and/or service application utilizing the resources of the communication network. In some of these embodiments, an application may register its identity (e.g., a unique identifier) and/or other application information with the computing device (e.g., latency manager). The application utilizing network resources may request policy from a computing device (e.g., latency manager) operating within the communication network. If the computing device approves (and/or accepts) the policy request, the computing device may transmit an acknowledge signal (or other communication) to the requesting application.

The computing device may be configured to assign high routing priority to certain applications (e.g., registered applications) and prioritize data packets associated with (and/or generated by) such applications. For example, as will be discussed in more detail below, an application needing to transmit time-sensitive information within the communication network, may submit a network policy request to ensure that associated data is received at a desired destination in a timely manner. In this example, a latency manager may be configured to tag (and/or otherwise identify) the one or more data packets associated with the requesting application, such that the latency manager may adjust network or routing policy in order to prioritize the transmission of said data packets and/or the information data payloads therein. For example, the latency manager may be configured to identify data packets associated with a particular application based on one or more data fields in the transmitted data packets, which may include a unique identifier (and/or signature) corresponding to the application that generated the data packet (e.g., source application). Additionally or alternatively, the latency manager may be configured to assign applications a low (or lower) priority based on obtained network performance and latency information, and the time sensitivity of the information e.g., data payload) to be transmitted by the data packet over the network.

The computing device (e.g., latency manager, network component, etc.) may be configured to monitor and/or manage network congestion, for example when the network is oversubscribed and/or when the latency manager predicts that the network may become oversubscribed. In other embodiments, a congestion manager, which may comprise a computing device, a software module, or any other suitable hardware or software component, may be configured to monitor and/or manage congestion over a communication network. In one of these embodiments, a computing device may be operatively connected to and/or in communication with the congestion manager to determine an optimal method for managing, reducing, and/or resolving congestion within the network. The congestion manager may determine whether congestion has occurred within a network in various ways without departing from the scope of the present disclosure, such as by inspecting an Explicit Congestion Notification (i.e., "ECN") of one or more data packets; by inspecting the Congestion Experienced ("CE") field of one or more data packets, and the like. In some embodiments, multiple computing devices (and/or congestions managers) may be spread across the network to monitor and/or manage network congestion. The multiple devices (and/or congestion managers) may be operatively in communication with one another.

As will be described in more detail below, a computing device, such as a latency manager, may also be configured to monitor and/or measure network congestion and performance, and may utilize such information to adjust the policy applied to various network components. As an example, if a customer of a content service decides to consume a content item, the content service may initiate an application session and further cause an application to request network resources to provide the customer with the requested content item. In this example, the application may request a bandwidth of 1 GB per second for a period of 10 seconds for the purpose of generating an adequate buffer for the user to begin streaming or consuming the content item. The application may subsequently request a bandwidth of 20 MB per second for an additional 10 minute time period, such that the remainder of the content item is retrieved. As discussed above, the latency manager may be configured to monitor other applications utilizing network resources to ensure that the latency manager can fulfill the application request in view of the network resources being utilized by other applications.

Referring back to the example above, the latency manager may be configured to create sufficient bandwidth for high-priority content streaming (e.g., the requested 1 GB/sec bandwidth), by redistributing network resources such that latency is added to other lower-priority ongoing applications. Subsequently, the latency manager may be configured to adjust its latency management policy after 20 seconds of streaming the high-priority content so that it can then begin scaling the amount of bandwidth devoted to the application requesting the high-priority content, as well as the amount of latency that is added to the other, lower-priority ongoing applications. As will be discussed in more detail below, the latency manager may be configured to dynamically adjust network (and/or latency) policy based on client requests, transmission priorities, and available network resources.

In the example depicted in FIG. 3, an assumption is made that transmitted data packets arrive at a respective network component simultaneously. For example, the first data packet and second data packet are assumed to have arrived at the network component 310 simultaneously. While, it is unlikely that data packets transmitted from a variety of sources within a network can be expected to arrive at particular network components simultaneously, during an application session, the TTB parameter (e.g., TTB value) of data packets in one or more network components' buffer may be reevaluated and/or adjusted after each data packet transmission from the network component. Referring back to the example shown in FIG. 3, prior to transmitting the first and second data packets received from the network components 301 and 302, respectively, the network component 310 may determine which of the two data packets may be transmitted first.

In some embodiments, a computing device (e.g., latency manager) may instruct one or more network components to implement specified network, transmission, or routing policy. For example, the latency manager may instruct one or more network components in a network to transmit data packets in order of lowest TTB value. As another example, the latency manager may instruct one or more network components in a network to drop and/or discard data packets having a TTB value below a threshold value, such as a value indicating an amount of time required for a packet to reach a particular network component (e.g., an end point or destination network component). In this example, the threshold value may be modified and/or adjusted based on a determined confidence level of the data packet's timely arrival at a final or specified destination. As yet another example, the latency manager may instruct one or more network components to transmit a number of data packets within a specified time period in order to maintain specified network performance parameters, such as data packet throughput. In some embodiments, a latency manager may utilize information stored in latency profiles and/or network reports to determine a network, routing, or transmission policy for specified network components.

As shown in table 360 of FIG. 3, the first data packet and second data packet both have an intended destination corresponding to the network component 350. In this example, the network component 310 may determine that the second data packet can be transmitted first (e.g., before the first data packet) since the second data packet has a lower TTB value than the first data packet. Similarly, as depicted in the table 360 of FIG. 3, the third data packet and fourth data packet both have an intended destination corresponding to the network component 350. In this example, the network component 311 may determine that the third data packet can be transmitted before the fourth data packet given that it has a lower TTB value than the third data packet.

In some embodiments, a network component may decrement the TTB value of the data packet based on an amount of time the data packet is buffered at (and/or remains at) the network component prior to transmission. For example, after a network component transmits a data packet, the TTB value of any remaining data packets still being buffered at a network component may be decremented by the network component based on an amount of time that the data packet has remained at (and/or been buffered at) the network component. Additionally or alternatively, the TTB value of the remaining data packets may be decremented by the network component based on an amount of time that has passed since the network component last evaluated the TTB values of data packets buffered at the network component. For example, referring to the table 360, prior to transmitting the second data packet, the network component 310 may be configured to further decrement the TTB value of the second data packet based on an amount of time that the data packet was buffered at the network component 310 before being transmitted to a subsequent network component (i.e., the network component 320).

As depicted in FIG. 3, each node in the network 300 may decrement the TTB values of a received data packet based on the amount of latency occurred by the data packet during transmission from a previous network component (e.g., node). As discussed above, in some instances, the TTB value of a data packet may be decremented to zero by a network component prior to reaching its final or intended destination. For example, referring to the table 363, the TTB value of the third data packet is reduced to zero after being transmitted from the network component 320 to the network component 330. After the TTB value of the third data packet has been reduced to zero, the network component 330 may take one or more actions in response to the TTB value of a data packet being reduced to zero. For example, the network component may drop the data packet and/or send an error message back to the source network component from which the data packet originated (i.e., the network component 303). In some embodiments, a latency manager may be configured to take one or more actions in response to the TTB value of a data packet reaching zero.

In some embodiments, in the instance that a source network component receives a threshold number of network communications (e.g., error messages), the source network component may take a variety of measures without departing from the scope of the present disclosure, such as by increasing the TTB value of data packets transmitted from the network component, ceasing transmission of data packets from the network component, selecting a different communication path for data packets, and the like. Additionally or alternatively, the source network component may implement curative measures in the instance a threshold percentage (%) of the data packets sent by the source network component subsequently incur an error (e.g., the TTB value expires) in transit for a particular communication path. As will be discussed in more detail below, the source network component may select a different network path for data packets based on latency reports and/or other information gathered by various network components within the network 300.

In some embodiments, the dropping and/or modification of data packets that are unable to reach an intended and/or final destination may be extended or improved based on the amount of network information available to each network component in the network, such as network information concerning the various network components and communication links surrounding each network component. For example, referring to the network component 320 in FIG. 3, the network component may attempt to send the third data packet, which currently has a TTB value of 10 ms, to the network component 330 over a communication link that has a latency of 10 ms. If the network component 320 had access to information indicating that the next hop along the path to the network component 350 (e.g., the intended and/or final destination for the third data packet) has a latency of 10 ms, then the network component 320 could determine whether transmitting a data packet to a network component one hop away would be an appropriate use of network resources. In particular, by utilizing such network information, the network component 320 may be configured to determine that the TTB value of the third data packet would be decremented to zero after/while being transmitted the next hop (i.e., the network component 330), and as such, it would be a waste of time and network resources to transmit the third data packet from the network component 320 given that the data packet would likely timeout before arriving at its intended or final destination.

With reference to the example above, the network information utilized by a particular network component (e.g., the network component 320) to determine whether the optimal use of available network resources may be extended past one hop away, and may be configured to encompass the optimal use of available network resources for data packets that are transmitted any number of hops away. Network components may record/store in memory (and/or other suitable data storage) information indicating the latency of various communication paths and/or network information that has been determined by and/or retrieved from other network components within the network. In some of embodiments, network components within a network may be configured to utilize such information to create and/or supplement latency reports.

Additionally or alternatively, a network component may be configured to subscribe to latency profiles and/or latency profile updates made available by neighboring network components within the network. Latency profile information collected and made available by network components may provide real-time network information regarding current latency over various communication paths in the network. In some of these embodiments, a network component may utilize obtained network information (e.g., network information obtained by the network component and/or from other network components) to build a reference table and/or database to aggregate and store network latency information (e.g., a latency reference table, latency database, etc.). The network component may utilize a latency reference table to determine whether to transmit certain data packets to another network component based on the respective TTB values of the data packets to be transmitted. The network component may also utilize the reference table when determining the optimal and/or most efficient communication path(s) for transmitting data packets over a network. In another of these embodiments, a latency manager may utilize information obtained from one or more network components to create a latency reference table and/or latency database, and to determine optimally efficient communications paths for transmitting data packets.

As an example, the latency reference table and/or database created by the network component 320 may include the following entry:

TABLE 1

| Destination | Uplink Route | TTB Latency of Path |
|---|---|---|
| Network component 350 | "right link" → "right link" | 10 → 30 → ? |

Table 1 shows an example entry corresponding to (and/or associated with) the network component 320 for a latency reference table. The reference table includes latency information for a communication path extending two hops away from the network component 320 (i.e., two network components away from the network component 320 along a communication path toward the intended or final destination of a data packet to be transmitted by the network component 320). In some embodiments, the reference table and/or database generated by a network component may include data identifying an intended or final destination of one or more data packets being buffered at the network component. For example, the reference table may include an identifier, a network address, and/or any other suitable information that unique identifies the intended or final destination for a particular data packet. As shown above, the "Destination" column generally describes and/or identifies a destination node (e.g., intended or final destination) for a data packet being buffered at the network component 320. Referring back to FIG. 3, as shown in the table 362, each of the data packets buffered at the network component 320 has a destination corresponding to the network component 350. The destination parameter within the latency reference table may identify a network component corresponding to an intended or final destination of a data packet. Additionally or alternatively, the destination parameter may correspond to an intermediary network component along the communication path of the data packet toward its final and/or intended destination (e.g., end point, destination node, etc).

In other embodiments, the latency reference table and/or database generated by a network component may include data indicating and/or describing a communication path associated with said network component (e.g., a source network component), and network latency information associated with the communication path. Each entry in the latency reference table and/or database may be associated with (and/or correspond to) a particular communication path that is a threshold number of hops away from a network component (e.g., source network component), and includes latency information for each hop along the communication path. For example, as shown in Table 1 above with respect to the Uplink Route (or node route) column and the TTB Latency of Path column, this particular entry in the reference table, generated by the network component 320, identifies a particular communication path in the network that is two hops (e.g., two network components, two links, etc.) away from the network component 320. In some embodiments, the Uplink Route column of the reference table may indicate a particular interface value. As discussed above, the latency table generated by a network component may include a plurality of entries, wherein each entry may include latency information for a variety of communication paths extending from the network component to a plurality of destination nodes.

The latency reference table and/or database generated by a network component may include data indicating a confidence factor for the network performance and latency information stored in the reference table. For example by determining the amount of data throughput being transmitted (and/or the maximum communication path speed for data traffic), a computing device (e.g., latency manager, network component, etc.) may approximate how much latency occurs on a communication path between a first network component (e.g., the network component 320) and a next network component (e.g., the network component 330). With respect to a communication path one hop away from the next network component (e.g., the network component 340), the first network component (e.g., the network component 320) may have less latency information for the subsequent communication path (e.g., the communication path between the network component 330 and the network component 340).

In some instances, a network component may be configured to receive periodic updates regarding the expected latency of one or more communication paths. The network component may utilize a recency of updated latency information to determine a confidence level/factor for latency and network performance information associated with a latency reference table. For example, if a network component receives updated latency information every 2 seconds, the network component may likely have the highest confidence in the information stored in the latency reference table upon receiving the update. However, as time passes and the latency information stored in the reference table becomes more outdated, the confidence level in the latency information may decrease over time. In some embodiments, the network component and/or any other suitable computing device (e.g., latency manager, etc.) may generate and utilize a determined confidence level as a weighting factor for the latency information and TTB values stored in the reference table. Accordingly, using the confidence level to weight latency information may prevent the network component from using outdated latency information when deciding whether to drop a data packet prematurely (e.g., before arriving at its intended or final destination).

As shown above in Table 1, the network component 330 is one hop away from the network component 320 along the communication path of the data packet, and the communication path between the network component 320 and the network component 330 has a latency of 10 ms, while the second hop along the communication path has a latency of 30 ms (e.g., the communication path between the network component 330 and the network component 340 has a latency of 30 ms). Referring now to the example FIG. 3, it is shown that the first hop away from the network component 320 toward the intended or final destination of a data packet (e.g., the network component 350) is a communication path from the network component 320 to the network component 330, which is associated with a latency value of 10 ms. Similarly, the second hop away from the network component 320 along this communication path is a communication link from the network component 330 to the network component 340 that is associated with a latency value of 30 ms. Although Table 1 does not identify the particular network components along the communication path associated with this particular table entry (i.e., the network components 330 and 340), as will be discussed in more detail below, the network component 320 may be configured to retrieve information identifying network components along a communication path from various other sources, such as error reports (and/or other network communications) transmitted from (and/or between) other network components in the network, latency or network profiles made available by surrounding network components, and the like.

As discussed above, a network component may utilize information stored in a latency reference table or database when determining whether to transmit or forward a data packet. In some embodiments, a network component may compare each data packet buffered at the network component to one or more entries within a latency reference table when determining whether to transmit the data packets. In other embodiments, a network component may compare a single data packet to one or more entries within a latency reference table to determine whether to transmit the single data packet. For example, referring to FIG. 3, the network component 320 may compare a first data packet (and/or information therein) to one or more entries in a latency reference table (e.g., Table 1) to determine whether to forward the first data packet toward its intended or final destination.

In some embodiments, a network component may utilize data identifying the intended or final destination of a data packet to locate an appropriate comparison entry in the reference table. In this example, the network component 320 may utilize the intended or final destination of the first data packet (e.g., the data packet corresponding to n=1) to locate an appropriate entry in the latency reference table to compare with the first data packet. The network component 320 may compare the TTB value of the first data packet to latency information stored in the reference table for a particular communication path in the network (e.g., data stored in the TTB Latency of Path column of Table 1) to determine whether the first data packet may successfully arrive at its intended and/or final destination (i.e., the network component 350). In this example, since the TTB value of the first data packet (i.e., 1940 ms) is greater than the amount of latency associated with the communication path from the network component 320 to the network component 350 (i.e., 10 ms+30 ms+20 ms=60 ms), the network component 320 may decide to forward the first data packet to the next network component in the communication path (i.e., the network component 330). As discussed above, the network component 320 may determine the amount of latency associated with the communication path from the network component 320 to the network component 350 by retrieving latency information (e.g., TTB latency of path information) from a latency reference table (e.g., the reference table entry depicted in Table 1) corresponding to the communication path from the network component 320 to the network component 350.

As another example, with respect to the third data packet (i.e., n=3 in table 362) buffered at the network component 320, because the TTB value of the third data packet (i.e., 10 ms) is less than the amount of latency associated with the communication path (e.g., TTB latency path information) two hops toward the intended or final destination of the third data packet (i.e., 40 ms), the network component 320 may decide not to transmit the third data packet to a subsequent network component, thus saving the network valuable resources. As discussed above, the network component (e.g., the network component 320) may also engage in subsequent curative actions after determining not to forward a data packet, such as by transmitting an error message to the source network component for the third data packet and/or to a latency manager.

Alternatively or additionally, latency information associated with a plurality of communication paths any number of hops (e.g., nodes) away from a current network component may be included in a latency reference table. As discussed above, each entry in the latency reference table may represent a specific communication path for a data packet to reach a particular destination in the communication network. The network component may supplement latency information in the latency reference table based on network performance and/or latency information obtained from one or more other network components in the communication network. As will be discussed in more detail below, latency information stored at (and/or by) a first network component may be broadcast (or transmitted) to other network components, and as such, the other network components may populate their respective latency reference tables utilizing the latency information obtained from the first network component. Accordingly, a latency reference table generated by a computing device (e.g., a network component) may include a plurality of entries indicating latency information for all available communication paths to (and/or between) every (and/or each) network component in the communication network.

Additionally or alternatively, the network component 320 may utilize the latency information in the reference table when determining whether to drop and/or to not transmit packets buffered at the network component. For example, as discussed above, utilizing the information stored in the entry of Table 1 depicted above, the network component 320 may determine that it can safely drop (and/or not transmit) any data packets destined for the network component 350 having a TTB value less than 40 ms, since it will take at least 40 ms for the data packet to travel two hops from the network component 320 toward the destination network component (i.e., the network component 350). Given the constant flux and distribution of resources across a network at any given time period, the latency information stored in the reference table for a particular network component may be out of date or slightly inaccurate. Accordingly, to account for such inaccuracies, the TTB Latency of Path data and/or other latency information associated with a communication path stored in a reference table may be modified, updated, and/or adjusted before a network component determines whether to transmit or drop a data packet. By adjusting the TTB Latency of Path value and/or other latency information stored in a latency reference table for one or more communication paths when determining whether to transmit or drop a data packet, the network component may regulate (and/or throttle) the amount of data packets that are dropped or transmitted. Additionally or alternatively, by adjusting the TTB Latency of Path value and/or other latency information associated with certain communication paths, the latency manager may be configured to regulate the amount (or number) of data packets that are dropped or transmitted for a variety of network applications at any given time. As described herein, the latency manager may utilize data (e.g., latency reports, etc.) obtained from a plurality of network components to prioritize and manage the transmission of data packets across various communication paths within the network.

In some embodiments, a weighting may be applied by a computing device (e.g., a latency manger, a network component, etc.) to the TTB Latency of Path value and/or other latency information associated with a communication path. For instance, referring to the example above, the network component 320 may halve the TTB Latency of Path value in the latency reference table entry depicted in Table 1 prior to comparing the entry with a data packet buffered at the network component 320. In this example, when determining whether to transmit or drop the third data packet (see the table 362 in FIG. 3), the network component 320 may compare the TTB value of the third data packet (i.e., 10 ms) with half the TTB Latency of Path value in the latency reference table entry (i.e., 40 ms/2=20 ms). Although in this particular example, the network component 320 would still decide to drop the third data packet (i.e., 10 ms<20 ms), by halving the TTB Latency of Path value associated with the communication path between the network component 320 and the network component 340, the network component 320 may reduce the number of data packets that are dropped prior to traveling at least two additional hops towards the destination node (i.e., the network component 350). In other words, by halving the TTB Latency of Path value, the network component 320 may now decide to drop those data packets buffered at the network component 320 that have a TTB value less than 20 ms. As another example, if the TTB Latency of Path value was doubled to 80 ms, the network component 320 would subsequently transmit those data packets buffered at the network component 320 that have a TTB value greater than 80 ms.

In some embodiments, the weighting applied to the TTB Latency of Path value and/or other latency information associated with a communication path may be adjusted based on the number of hops (e.g., nodes) away the communication path is from a current network component. In some of these embodiments, the network component may adjust the weighting downwards by a factor corresponding to the number of hops away the communication path is from the current network component. For example, when determining whether to transmit or drop the third data packet, the network component 320 may compare the TTB value of the third data packet with 100% of the TTB Latency of Path value in the latency reference table entry corresponding to the communication path between the network component 320 and a next network component (i.e., the network component 330). As another example, when determining whether to transmit or drop the third data packet, the network component 320 may compare the TTB value of the third data packet with 50% (or half) the TTB Latency of Path value in the latency reference table entry corresponding to the communication path between the network component 320 and a network component two hops away (i.e., the network component 340). As another example, when determining whether to transmit or drop the third data packet, the network component 320 may compare the TTB value of the third data packet with 25% (or ¼) the TTB Latency of Path value in the latency reference table entry corresponding to the communication path between the network component 320 and a network component three hops away (i.e., the network component 340), and so on. Additionally or alternatively, the weighting applied to the TTB Latency of Path value and/or other latency information associated with a particular communication path may be determined based on a confidence level associated with the latency information. For example, as discussed above, the confidence level for latency information may be determined based on a factor of the amount of time since the latency information was last updated (e.g., a recency of the latency information).

As discussed above, a network component may regulate (and/or throttle) the amount of data packets that are dropped or transmitted at any given time period. In some embodiments, the weighting applied to a TTB Latency of Path value and/or other latency information associated with a communication path in the network may be based on an algorithm and/or formula relating to a current performance of the network component and/or the network as a whole. The weighting applied to a TTB Latency of Path value and/or other latency information associated with a communication path in the network may be dynamic. For example, the weighing applied to a TTB Latency of Path value and/or other latency information associated with a communication path in the network may be based on a current load of the network component (e.g., how many other data packets does the network component need to send; what is the current capacity of the network component, etc.). The network component may be configured to increase the weighting applied to a TTB Latency of Path value and/or other latency information associated with a communication path in the network in order to drop more data packets that are less likely to successfully reach their respective destination in a timely manner. Additionally or alternatively, the network component may decrease the weighting applied to a TTB Latency of Path value and/or other latency information associated with a communication path in the network in order to drop fewer data packets that are less likely to successfully reach their respective destination in a timely manner. The network component (e.g., network device, network node, router, etc.) may adjust the weighting applied to a TTB Latency of Path value and/or other latency information associated with a communication path in the network based (at least in part) on a variety of other factors without departing from the scope of the present disclosure, such as network (and/or network component) performance metrics, and the like. A latency manager operatively in communication with (and/or connected to) a network component may request the network component to adjust TTB Latency of Path values and/or other latency information associated with a communication path in the network for one or more entries in the network components' latency reference table.

Alternatively or additionally, before deciding whether to transmit or forward the first data packet, the network component 320 may retrieve additional network and latency information for communication paths extending further hops away than the information provided in a latency table, such as the Table 1 entry shown above. For example, before transmitting the first data packet, the network component 320 may retrieve latency information for a communication path extending a number of hops away (e.g., a number of hops away for the first data packet to reach its intended or final destination).

As depicted in the entry for Table 1 above, this particular entry in the reference table generated by the network component 320 (e.g., the source network component for this particular reference table) does not include network or latency information for a communication path that is three or more hops away from the network component 320. However, as will be discussed in more detail below, a network component, such as the network component 320, may be configured to retrieve and/or subscribe to network information (e.g., latency profiles; reference table data, etc.) generated and/or obtained by other network components in order to supplement information within a latency reference table. Accordingly, each network component in a network may have access to network and/or latency information stored at and/or obtained by other network components for a plurality of communication paths within the network.

Referring back to FIG. 3, a network component (e.g., network device, network node, router, etc.) may determine an order in which data packets should be transmitted to their respective destinations. For example, the network component may determine which data packets in its buffer may be transmitted first. As discussed above, in some instances, a network component (e.g., the network component 310) may select a data packet in its buffer to transmit having the lowest TTB parameter (e.g., lowest TTB value) that is still predicted/expected to timely arrive at its respective destination (e.g., destination node). However, a first complicating factor presented by many network topologies is that network components (e.g., network devices, network nodes, routers, etc.) that are not directly connected to the intended or final destination of a data packet via a communication path (e.g., a network component one hop away) may likely not have sufficient information to determine the number of hops (and/or the amount of time) it may take for a data packet to arrive at an intended or final destination when said final destination is a plurality of hops away. In other words, the network component may not have access to data indicating an absolute latest time (and/or time period which) the network component can transmit the data packet while still ensuring that the data packet will arrive at its intended or final destination in a timely manner. Additionally, a second complicating factor may relate to the amount of time a data packet is buffered at one or more network components. If a network component consumes time and/or resources by excessively buffering the data packet, the network component likely may no longer expect for other network components (e.g., network devices, network nodes, routers, etc.) in the network communication path (along the path toward an intended or final destination for the data packet) to immediately forward the data packet in order to ensure successful and timely delivery of the data packet. For example, one or more of the other network components may also need to buffer the data packet before forwarding the data packet toward the packet's intended or final destination.

Previous methods of network management attempt to aggregate data packets that are to be transmitted to the same or similar end point around the same time. However, such methods require that the specified data packets cannot be sent until each of the data packets are ready to be combined, which may lead to increased and/or unwanted latency within the network. Aspects of the present disclosure address this issue, for example, by fragmenting the information payload of a data packet such that one or more portions of the fragmented payload may be transmitted to an intended destination or end point over a period of time. In this example, an entity such as a client device, latency manager, and/or other computing device may be configured to fragment the information payload of a data packet. Thus, rather than filling a first data packet to its maximum data payload capacity, in one or more embodiments of the present disclosure, the information to be included within the first data packet may be transmitted over time using one or more smaller sized data packets.

As discussed above, a network component may be configured to inspect the one or more data packets in a buffer (and/or queue) and determine which data packets may be transmitted first based on a variety of factors, such as routing policy, TTB values, network priorities, and the like. The network component may inspect buffered data packets to determine which data packets have the lowest TTB. By intentionally fragmenting what would otherwise be a large data transfer within the network, the latency incurred by one or more data packets transmitted over the network may be reduced since the fragmented sections of a data payload may be configured to allow other applications to advance other high priority items of information via data packets sent over the network. Content or service applications operating within the network may selectively identify certain data packets to carry high priority information across the network, based on their respective TTB fields (and/or other characteristics), to ensure that the high priority information arrives at an intended destination within a particular delivery time period.

In some embodiments, the fragmentation of data packets may be managed locally (e.g., at the client device), and/or by a latency manger. For example, when determining the priority of data packets and which data packets to transmit first, a latency manager may assess the size of a data packet and its respective TTB field to determine whether the data packet may be fragmented and portions of the original data payload may be transmitted over time, rather than in a single transfer. The latency manager may utilize a variety of information sources when determining whether to fragment a data packet without departing from the scope of the present disclosure, such as network performance and latency information obtained from a plurality of network components, network reports, latency profiles, current routing policies, and the like. A network component (e.g., network device, network node, router, etc.) receiving a data packet may inspect its TTB parameter along with the respective TTB parameters of the one or more data packets buffered at the network component to determine which data packets to transmit. The network component may be configured to inspect the queue (or buffer) based on the TTB parameters of one or more data packets to determine how to fragment, extract, and/or reorganize data and data payloads for the one or more data packets in the buffer.

The complicating network factors discussed above may be, in part, related to the fact that each network component (e.g., network device, network node, router, etc.) within the network likely not having access to full (or aggregate) communication path and latency information for every destination in a network (e.g., the Internet). Moreover, even if such information was made available, these network components may not have information sufficient to determine what the buffer state of each network component along an intended communication path would be in the future since data packets are constantly flowing from different sources and destinations via various network components and communication paths in the network. However, utilizing communication path and latency information obtained from a plurality of network components (e.g., network devices, network nodes, routers, etc.) in a network, before transmitting a data packet, an initial network component may be configured to determine a maximum amount of buffer time permissible for transmitting a data packet to its intended or final destination in a timely manner.

The last network component in the communication path for the first data packet, prior to reaching the intended or final destination, (i.e., the network component 340) may determine that the next hop in the communication path (i.e., the network component 350) corresponds to the intended or final destination for the first data packet and/or other data packets. In this example, the network component 340 may also be configured to retrieve (and/or access) network data indicating the latency for the communication path between itself and the intended or final destination network component (e.g., 20 ms). For instance, the network component 340 may retrieve such latency information from an error message transmitted from other network components in the network (e.g., the network component 350).

A network component may determine a maximum amount of buffer time permissible for a data packet by subtracting a current TTB value of the data packet by the total amount of latency remaining along a communication path for the data packet toward its intended or final destination (e.g., the destination network component). For instance, referring to the example shown in FIG. 3, the network component 340 may determine the maximum amount of buffer time permissible for the first data packet is 1880 ms (i.e., 1900 ms-20 ms). In some embodiments, a network component may store in memory (or other suitable data storage) the max buffer time for a plurality data packets and corresponding network information. For instance, referring to the example above, the network component 340 may create the following max buffer reference table:

TABLE 2

| Packet # | Destination | TTB | Next Hop Latency | Max Buffer Time |
| --- | --- | --- | --- | --- |
| First | 350 | 1900 | 20 | 1880 ms |
| Second | 350 | 210 | 20 | 190 ms |
| Fourth | 350 | 70 | 20 | 50 ms |

In some embodiments, a latency manager may request information from one or more network components, such as the information shown above in Table 2. In other embodiments, the latency manager may be configured to determine the information shown above in Table 2, based on data retrieved from one or more network components in the communication network. Network components maybe further configured to transmit such information to one or more other network components, latency managers, and/or other computing devices. For example, such information may be broadcast and/or transmitted to other network components in the network through multicast network messages. As another example, such information may be included within a network or latency report, and subsequently transmitted to a latency manager and/or other network components.

A network component may be configured to identify future time periods where the network component may over-utilize its bandwidth. In some embodiments, the network component may be further configured to adjust transmission priority policy for data packets scheduled to be transmitted from the network component in order to maximize efficiency and/or network resource. For example, if each data packet transmitted from a network node is fixed at a threshold size (e.g., 1000 bytes) and the communication path corresponding to the next hop from the network component has a threshold throughput (e.g., 10,000 bytes/second), then the network component may be configured to determine an amount of time needed to transmit each data packet. In this example, each data packet will take at least 100 ms (i.e., 1000 bytes/10,000 b/s) to be transmitted from the network component.

Utilizing the information above, the network component may be configured to calculate (and/or determine) future periods of time where more than one data packet buffered at the network component may likely be sent during a threshold timeframe (e.g., a 100 ms timeframe). Additionally or alternatively, utilizing the above information (e.g., data indicating an amount of time needed to transmit each data packet and/or data indicating various calculated time periods where a number of data packets need to be sent during a threshold time period), the network component may be further configured to determine whether to transmit a data packet based on current transmission priority policy and/or whether to first reduce data packet throughput at the network component (e.g., the rate at which a specified number of data packets need to be transmitted from the network component during a threshold time period) before executing the current transmission priority policy.

For instance, in the example above, rather than transmitting buffered data packets using a first transmission priority policy (e.g., transmitting data packets having the lowest TTB value first), the network component may be configured to first reduce the number of data packets that are sent from and/or by the network component during a threshold time period. For example, the network component may reduce the number of data packets that are sent from and/or by the network component every 300 ms to less than or equal to three (3) data packets (i.e., less than one data packet transmitted per 100 ms). Additionally or alternatively, since the network component may likely receive new data packets having unknown TTB values, the data packet throughput may be further reduced to provide additional bandwidth flexibility such that two (2) data packets (or fewer) are transmitted from the network component for each 300 ms time span. A latency manager (and/or other suitable computing device) may instruct a network component to achieve (and/or maintain) a level of data packet throughput prior to executing a specified (and/or current) transmission priority policy.

As network components retrieve and/or store adjacent node (e.g., network component) latency information, as discussed above, and other network performance information (e.g., current buffer size, median or average TTB value(s) of data packets in a network component buffer, and other suitable performance metrics), the network components may be configured to request such information from a plurality of other network components in the communication network. In some embodiments, a network component may store latency information and other network information in communications (e.g., "network reports") that are transmitted to other network components in the network. For example, a first network component may transmit, to a second network component, latency information for a plurality of communication paths within the communication network.

Network components may be configured to transmit network reports in multicast communications within the network. The multicast messages, including the latency information and other network performance information described above, may be transmitted from a first network component to one or more other network components and/or groups of network components, such as network components that have subscribed to receive a network report (e.g., a latency report) from the first network component. In other embodiments, a network component may be configured to transmit one or more network reports to a plurality of network components. In some of these embodiments, a network component (e.g., node) may request to receive network reports from one or more network components in a communication network. Transmitting network reports from a first network component to a plurality of network components and/or configuring network components to subscribe to network reports published (and/or made available) by other network components, facilitates the efficient exchange of network and latency information across a communication network.

For example, in the instance a communication network includes a plurality of network components (e.g., network devices, network nodes, routers, etc.), and one or more network components request (and/or retrieve) latency and other network information from adjacent network components in the communication network, to reduce the consumption of total network resources, it may be inefficient for certain (and/or core) network components to periodically (e.g., every second, 500 ms, etc.) transmit network report information and/or updated network report information to each network component in a network. Instead, by configuring network components to subscribe to multicast network reports from at least a first network component, certain network components in the network may transmit network reports to a subset (and/or group) of network components in the communication network, which may subsequently forward the network reports to other network components in the network that are subscribed to the same network reports.

Additionally or alternatively, one or more latency managers operating in a network may request (and/or receive) network reports from one or more network components in a network. In some embodiments, a latency manager may be configured to push network reports and network report updates (e.g., updated network report information) to one or more network components. In some embodiments, a network component may request (and/or subscribe to) network reports from particular network components. For example, a first network component may request (and/or subscribe to) network reports associated with (and/or generated by) other network components that may receive a buffered data packet from the current network component.

Additionally or alternatively, a network component may obtain network and latency information from other network components via various communications transmitted over the network (e.g., ICMP messages, error messages, and the like). As discussed above, each network component (e.g., network device, network node, router, etc.) in the network may transmit and/or forward communications (e.g., ICMP messages, error messages, etc.) indicating that the TTB value of a data packet expired during transit and/or that a network component further down the communication path has dropped the packet. When such communications/messages are sent from the network component that dropped the data packet, back through the path of network components traversed by the data packet along a communication path, one or more network components along said communication path may be configured to record the occurrence (e.g., the packet being dropped) and data stored within the communication/message, such as the source network component and/or destination network component associated with the data packet, how far the data packet was able to transit along a communication in the network before the TTB expired (e.g., a number of hops traversed), and the like. In some embodiments, a network component may utilize information obtained from such communications to supplement data stored in a latency reference table or database. In other embodiments, a network component may utilize information obtained from network latency reports and network communications (e.g., ICMP messages, error messages, etc.) to supplement data stored in a latency reference table or database.

In some embodiments, a network component may store information obtained from the network communications discussed above (e.g., ICMP messages, error messages, etc.) in a database or reference table. As an example, for each received network communication, a network component may generate an entry in a communication reference table, such as the entry depicted in Table 3 below:

TABLE 3

| Current Node | Destination Node (End Point) | # of Hops Away of Node that Dropped Packet | Time Since Dropped |
|---|---|---|---|
| Network Component 311 | Network Component 350 | 2 | 40 ms |

Referring to the example in FIG. 3, Table 3 shows an example entry in a communication reference table generated by a network component (i.e., the network component 311) in the network 300 that previously transmitted the third data packet and that has subsequently received a network communication (e.g., ICMP messages, error messages, etc.) indicating that the third data packet has been dropped. As discussed above, the third data packet may eventually be dropped by the network component 330 when the TTB value of the third data packet is reduced to zero. After the third data packet is dropped, the network component 330 may be configured to transmit a network communication (e.g., an ICMP message) back to the network component from which the third data packet originated (i.e., the network component 303). The network communication is transmitted by the network component 330 to the network component 303 along the same communication path in the network that the third data packet traversed to arrive at the network component 330.

The network communication (e.g., the ICMP message) transmitted by the network component 330 may include information indicating, among other information, the network component that dropped the third data packet (i.e., the network component 330), a destination network component and/or end point of the dropped data packet (i.e., the network component 350), a number of hops away the network communication is from the network component that dropped the data packet, and a parameter (e.g., the "time since dropped" parameter) indicating an amount of time that it has taken the network communication to traverse the communication path back to a current network component.

In the example entry in Table 3 above, the current network component is represented by the network component 311, which also corresponds to the network component that generated the example communication reference table entry shown in Table 3. As indicated in Table 3 and as shown in FIG. 3, the current network component (i.e., the network 311) is two hops away along the communication path traversed by the third data packet from the network component that dropped the third data packet (i.e., the network component 330). A parameter, such as the "time since dropped" parameter in the network communication may begin at a first value (e.g., zero (0)) when the communication is transmitted from the network component that dropped the third data packet (i.e., the network component 330). The parameter, such as the time since dropped parameter, in the network communication may be incremented upwards by one or more network components that receive the network communication as the communication propagates, over the communication path the dropped data packet previously traveled, back to the network component from which the data packet originated (i.e., the network component 303). The parameter, such as the time since dropped parameter, in the network communication may be incremented by a network component in accordance with an amount of latency experienced by the network communication as it traverses a communication path between two network components.

As shown in FIG. 3, the network communication sent by the network component 330 is first transmitted to the network component 320, and then transmitted again to the network component 311. At the time the network component 311 receives the network communication sent by the network component 330, the network communication would have a parameter value (e.g., the time since dropped value) of 40 ms (i.e., 10 ms+30 ms) based on the latency associated with the communication path between the network component 330 and the network component 311.

The current network component may vary with respect to the one or more different entries in a communication reference table. Other entries in the communication reference table may be generated by network components in the network 300 that previously transmitted the third data packet and have subsequently received the network indicating that the third data packet has been dropped. For example, referring to FIG. 3, the network component 320 may also generate an entry in the above-discussed communication reference table. The example entry generated by the network component 320 for the third data packet is represented in the table below:

TABLE 4

| Current Node | Destination Node (End Point) | # of Hops Away of Node that Dropped Packet | Time Since Dropped |
| --- | --- | --- | --- |
| Network Component 320 | Network Component 350 | 1 | 10 ms |

As shown in Table 4 above, for this entry, the current network component is represented by the network component 320, which also corresponds to the network component that generated the example communication reference table entry. As indicated in Table 4 and as shown in FIG. 3, the current network component (i.e., the network component 320) is one hop away from the network component that dropped the third data packet (i.e., the network component 330). In this example, the time since dropped parameter in the network communication is incremented upwards from zero (0) in accordance with the amount of latency experienced by the network communication as it traversed the communication path between the network component 330 and the network component 320.

With respect to the example depicted in Table 3 above, the network component 311 (and/or each network component along the communication path between the network component 330 and the network component 311) may be configured to store in memory information within the network communication (e.g., ICMP message), including the data shown in Tables 3 and 4. The network component 311 may be configured to access information in one or more communication reference tables to determine that data packets transmitted from the network component 311 to the network component 350, may require, at a minimum, a TTB value greater than or equal to 40 ms since the third data packet was dropped two hops away and the ICMP message took 40 ms to propagate from the network component 330 back to the network component 311. Accordingly, the network component 311 may subsequently be configured to drop any data packets destined for the network component 350 that have a TTB value greater than or equal to 40 ms.

Additionally or alternatively, the network component 311 (and/or other network components) may be configured to access information in one or more communication reference tables to determine an optimal communication path for a data packet. For example, the network component 311 may be configured to access information in one or more communication reference tables to determine a communication path that will minimize the amount of latency experienced by a data packet between the network component 311 and a destination network component in the network. As discussed above, the time since dropped parameter in the communication reference table indicates an amount of time that it has taken a network communication to traverse a communication path back to a particular network component, and further provides an indication of an amount of latency along the communication path. Accordingly, a network component may utilize the time since dropped parameter of a communication reference table to determine an amount of latency associated with, and/or an amount of time it has taken a network communication to traverse, a communication path within the network. The network component may be configured to utilize the latency information for the plurality of communication paths to determine a communication path in accordance with a network policy, such as determining a communication path from the network component to an endpoint that minimizes an amount of latency experienced by the data packet. The network component may be configured to determine an optimal communication path for each data packet buffered at the network component.

In this example, the network component 311 may analyze the time since dropped parameter for a plurality of reference table entries corresponding to a particular destination network component (or end point), such as the destination network component for a buffered data packet to be transmitted by the network component 311. The network component 311 may determine a plurality of communication paths in the network to transmit the buffered data packet to its intended destination or end point, and may utilize the reference table entries to further determine an amount of latency associated with, and/or an amount of time it has taken a network communication to traverse, each of the plurality of communication paths. The network component may be configured to determine an optimal communication path (e.g., a communication path associated with the least amount of latency) for a plurality of data packets buffered at the network component.

Additionally or alternatively, after a network component receives a number of communications (e.g., ICMP message), the network component may be configured to generate one or more performance metrics based on the network and latency data included in the communications. For example, referring to FIG. 3, the network component 311 may be configured to statistically average stored parameter data (e.g., the time since dropped data) when determining whether to drop or transmit a packet. Additionally or alternatively, the network component 311 may calculate and/or determine a weighted average for stored parameter values (e.g., the time since dropped values) when determining whether to drop some (or all) data packets destined for the network component 350. For example, the network component 311 may drop some (or all) data packets destined for network component 350 that do not have a TTB value above 40 ms, in the instance that the average "time since dropped" value is halved). By transmitting network and latency information via communications relating to dropped data packets, the network saves bandwidth between each other network component along the communication path of the data packet since the other network components may otherwise not receive an indication that the third packet has been dropped.

Additionally, disseminating network and latency information via the network communications described above provides faster feedback to the network component that originally transmits a data packet as compared to having to wait for an acknowledge signal that may not arrive at the source network component and/or that may take a lengthy amount of time to arrive back at the source network component. A computing device (e.g., network component, latency manager) may utilize transmission control protocol (TCP) tuning techniques (and/or congestion windows) to increase network performance and reliability of data transmission. In some examples, the transmitting network component may transmit a number of data packets before waiting for a response (e.g., an acknowledgement). If the network component does not receive an acknowledgement from one of the transmitted data packets, it may cease transmitting data packets and wait a threshold time period for a response. Any suitable threshold time period may be utilized without departing from the scope of the present disclosure, such as 10 ms, 100 ms, 1 s, and the like. In the event that it does not receive a response, the network component may be configured to retransmit the one or more data packets. Thus, utilizing such TCP tuning techniques may provide a negative acknowledgement much faster to the original transmitting network component (e.g., the source network component), which may allow the network component to attempt to retransmit the data packet and/or implement curative measures within the network more quickly and efficiently.

As noted above, when a source network component (e.g., the network component that initially transmitted a data packet and/or the network component from which the data packet originated) receives an ICMP message, the source network component may be configured to inspect information (e.g., time since dropped data) and determine whether, at a minimum, it will take at least the amount of time indicated in the reference table (e.g., the time since dropped data) to deliver a data packet to an intended or final destination. If the source network component determines that the determined amount of time is acceptable in view of network policy, the source network component may transmit the data packet. If the source network component determines that the determined amount of time is unacceptable in view of network policy, the source network component may be configured to retransmit the data packet with a higher TTB value. Alternatively, the source network component may be configured to not transmit the packet.

Figure 4A:
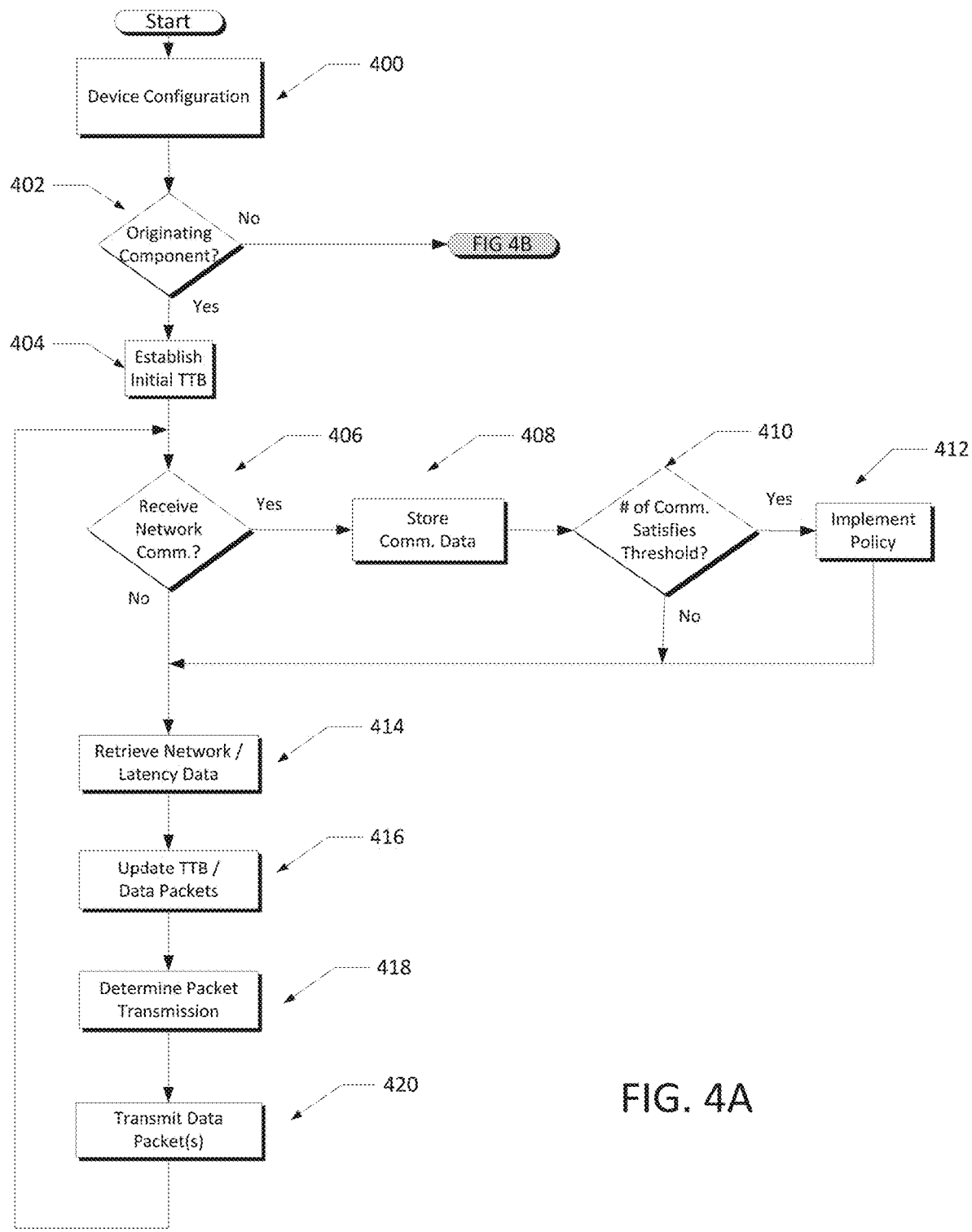
FIGS. 4A-B depict flowcharts that show exemplary methods of managing a communication network in accordance with one or more illustrative aspects discussed herein.
Figure 4B:
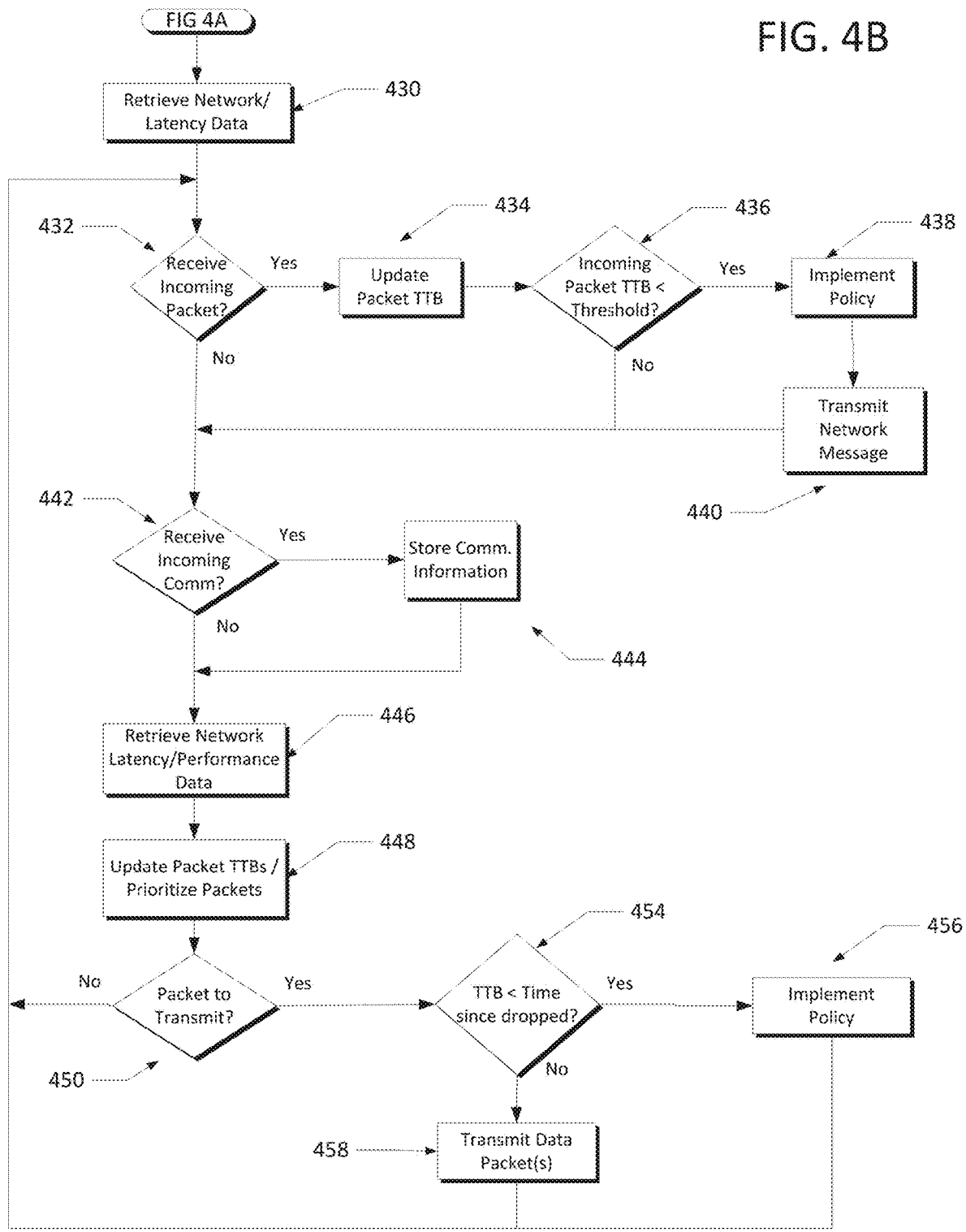

Having discussed an architecture that may be used to perform network and latency management as described above and shown in FIG. 3, discussion will now turn to a method of applying network and latency management policy, as illustrated in FIGS. 4A-B.

FIGS. 4A-B show exemplary process flows of a method for managing network and latency management policy and the transmission of data packets over a communication network. In one or more embodiments, the example method shown in FIGS. 4A-B and/or one or more steps thereof may be performed by a computing device (e.g., the computing device 200). Additionally or alternatively, the example method shown in FIGS. 4A-B and/or one or more steps thereof may, in some instances, be performed by a latency manager configured to manage network resources and latency within a network. Additionally or alternatively, the example method shown in FIGS. 4A-B and/or one or more steps thereof may, in some instances, be performed by a network component, such as a network device, network node, router, etc. In some embodiments, the latency manager may comprise a computing device, a network component, a software application, or any other suitable hardware/software component. In other embodiments, the example method shown in FIGS. 4A-B and/or one or more steps thereof may be embodied in computer-executable instructions that are stored in a computer-readable medium, such as a non-transitory computer-readable memory.

At step 400, the computing device may be configured to perform various system configuration steps. This configuration process may include registering the computing device with a network and/or service provider. For example, this registration step may include receiving device information (e.g., device ID, application session ID, etc.) for establishing an operative relationship within the communication network. Additionally or alternatively, the computing device may register one or more applications operating over the network. The computing device may conduct initial priority determinations with respect to various registered and/or unregistered applications. In some embodiments, the computing device may attempt to determine network and latency information associated with a communication network. For example, the computing device may transmit data packets to one or more network components in a communication network to identify/determine latency information associated with adjacent communication paths and network components. In the instance that the computing device comprises a latency manager, the computing device may be configured to instruct a network component to transmit data packets to one or more other network components to determine latency and other network information.

At step 400, in some embodiments, the computing device may subscribe to receive data (e.g., network reports, network information, latency information, etc.) from one or more network components in the communication network. In other embodiments, the computing device may generate and/or populate a latency reference table (or database) based on latency and/or network information obtained in step 401.

At step 402, the computing device may determine whether it is an originating network component (e.g., source network component) from which a data packet is to be transmitted within the communication network. A source network component may comprise the network component from which a data packet was originally/initially transmitted. In some embodiments, a latency manager may determine whether a network component in the communication network is an originating (or source) network component for a data packet.

If the computing device determines that it is not an originating network component in the communication network, the method may proceed to step 430. If the computing device determines that it is an originating network component in the communication network, the method may proceed to step 404, where the computing device may establish an initial TTB value for one or more data packets to be transmitted. In some embodiments, the computing device may retrieve from another computing device (e.g., a latency manager) data indicating a TTB value for a data packet. In other embodiments, the computing device may determine an initial TTB value for one or more data packets based on network and/or latency information obtained in step 400. In some embodiments, the computing device may modify a data packet to include a TTB value and/or related information within a header (or other suitable segment) of a data packet.

After initial TTB values have been determined for one or more data packets, the method may proceed to step 406, where the computing device may determine whether a network communication containing relevant network and/or latency information has been received. A network component may obtain network and/or latency information from other network components via various communications transmitted over the network (e.g., ICMP messages, error messages, and the like). As discussed above with reference to FIG. 3, network components (e.g., network devices, network nodes, routers, etc.) in the communication network may transmit or forward communications (e.g., ICMP messages, error messages, etc.) indicating that a data packet's TTB expired in transit along a communication path within the network. For example, in the instance that a data packet is dropped by a network component during transit, a communication/message including latency, network, and other suitable information may be transmitted from the network component back along the communication path to the source network component.

At step 406, if the computing device determines that a network communication has not been received, then the method may proceed to step 414. If the computing device determined that a network communication has been received, the method may proceed to step 408, where the computer device may store in memory (or other suitable data storage) information included/stored in the network communication received in step 406. In some embodiments, the computing device may transfer to another computing device (e.g., latency manager) information included/stored in the network communication. In other embodiments, the computing device may determine an identity of the data packet from which the network communication originated. The computing device may retrieve from the network communication a data packet identifier, an application session identifier, and/or any other suitable information identifying the data packet (and/or the application that generated the data packet) that is associated with the network communication received in step 406 (e.g., the dropped or expired data packet that precipitated the transmission of the network communication). In some of these embodiments, the computing device may monitor the number of network communications received in step 406, as well as the identity information discussed above. In some of these embodiments, the computing device may utilize this information to determine a number of received network communications for one or more data packets and/or network applications.

In some embodiments, the computing device may update and/or rearrange the transmission order of one or more buffered data packets based on TTB parameter data and/or information included in the network communication received in step 406. In other embodiments, the computing device may continuously update the TTB values for one or more buffered data packets, and may be further configured to reevaluate the TTB values of buffered data packets in view of current network and/or routing policy.

At step 410, the computing device may determine whether a number of network communications received for a particular network application (and/or data packet) satisfies a threshold. In some embodiments, the computing device may request from another computing device (e.g., a latency manager) data indicating the number of threshold network communications for a particular data packet and/or network application. In some of these embodiments, the computing device may receive instructions from another computing device (e.g., latency manager) to modify and/or adjust the network communication threshold for a data packet and/or network application. In some of these embodiments, the network communication threshold may be adjusted based on current and/or historical network performance and latency information.

If the computing device determines that a threshold number of communications has not been satisfied, the method may proceed to step 414. If the computing device determines that a threshold number of communications has been satisfied, the method may proceed to step 412, where the computing device may implement network policy with respect to one or more data packets and/or network applications. For example, in some embodiments, the computing device may drop the data packet received in step 406. As another example, the computing device may transmit instructions to the originating network component for the data packet received in step 406. In this example, the computing device may instruct the originating network component to modify the initial TTB value for the data packet.

At step 414, the computing device may retrieve network and/or latency information from another computing device (e.g., latency manager). In some embodiments, the computing device may retrieve network and/or latency information from memory and/or any other suitable data storage. For example, the computing device may retrieve network and/or latency information from a latency reference table (or database). In some embodiments, the computing device may retrieve updated network and/or latency information from a network component (e.g., network device, network node, router, etc.) in the communication network. As discussed above, the network and/or latency information may include data contained within one or more network reports and/or latency files associated with one or more network components in the network, as described above with respect to FIG. 3.

At step 416, the computing device may update and/or adjust the TTB value for one or more data packets at the computing device. In some embodiments, the computing device may update and/or adjust the value of a TTB field/parameter for one or more data packets buffered at the computing device. The computing device may update the TTB value for a data packet based on network and/or latency information retrieved in step 414. In some embodiments where the computing device comprises a latency manager, the computing device may be configured to instruct one or more network components in a communication network to update the TTB value for one or more data packets buffered at a network component. In some examples, the latency manager may instruct one or more network components to apply an updated routing (and/or transmission policy, network policy, etc.) to one or more data packets buffered at a network component. In some embodiments, the computing device may be configured to continuously update and/or adjust the TTB value for one or more data packets buffered at the computing device.

In some embodiments, the computing device may be configured to inspect the queue (or buffer) based on the TTB parameters of one or more data packets to determine how to fragment, extract, and/or reorganize data and data payloads for the one or more data packets. As discussed above with respect to FIG. 3, the computing device may fragment the information payload of a data packet such that one or more portions of the fragmented payload may be transmitted to an intended destination or end point over a period of time. The computing device may identify data packets having suitable TTB values, which would transmit one or more portions of the fragmented information payload to an intended destination within an appropriate delivery time. In some embodiments, the computing device may be configured to prioritize and insert one or more portions of the fragmented payload into other data packets buffered at the computing device. In other embodiments, the computing device may prioritize one or more portions of the fragmented payload based on information received from a latency manager. In still other embodiments, the computing device may reprioritize one or more data packets based on updated routing and/or transmission policy.

At step 418, the computing device may determine (and/or identify) one or more data packets to transmit. In some embodiments, the computing device may determine one or more data packets to transmit based on routing and/or transmission policy. In some of these embodiments, the computing device may transmit one or more data packets based on their respective TTB values. For example, the computing device may transmit a buffered data packet having the lowest TTB value. In another embodiment, the computing device may determine one or more data packets to transmit in order to maintain a threshold throughput rate.

At step 420, the computing device may transmit and/or forward a data packet to another computing device and/or network component. The computing device may transmit or forward the one or more data packets identified in step 418. After the computing device has transmitted the one or more data packets, the method may proceed back to step 406.

Referring now to FIG. 4B, at step 430, after determining that the computing device is not an originating network component, the computing device may retrieve network and/or latency information from another computing device (e.g., latency manager). In some embodiments, the computing device may retrieve network and/or latency information from memory and/or any other suitable data storage. For example, the computing device may retrieve network and/or latency information from a latency reference table (or database). In some embodiments, the computing device may retrieve updated network and/or latency information from a network component (e.g., network device, network node, router, etc.) in the communication network. In other embodiments, the computing device may perform one or more of the features described above with respect to step 414.

At step 432, the computing device may be configured to determine whether it has received an incoming data packet. If the computing device determines that a data packet has not been received, the method may proceed to step 442. If the computing device determines that a data packet has been received, the method may proceed to step 434, where the computing device may update and/or adjust the TTB value for the one or more data packets received by the computing device in step 432. In some embodiments, the computing device may update and/or adjust the TTB value for a data packet based on retrieved network and/or latency information, such as network and/or latency information retrieved in step 430. In some embodiments where the computing device comprises a latency manager, the computing device may be configured to instruct one or more network components that received a data packet to update the TTB value for the respective data packet(s). In other embodiments, the computing device may update and/or adjust the TTB value of one or more data packets based on an expected latency that the packet(s) may receive as it waits in the buffer of the network component.

In some embodiments, the computing device may continuously update and/or adjust the TTB value for one or more data packets buffered at the computing device. In some of these embodiments, the computing device may determine in what order and/or where to insert the data packet (e.g., the data packet received in step 432) into the buffer of the computing device based on TTB values and/or other latency information. In other of these embodiments, the computing device may insert a data packet into its buffer based on current network and/or routing policy, such as organizing the data packets in the buffer based on descending (or ascending) TTB values.

Additionally or alternatively, the computing device may arrange or rearrange other data packets buffered at the computing device based on TTB, network policy, routing policy, and the like. For instance, referring to the example above discussed with reference to Table 2, where a network component may transmits more than three (3) data packets within a 300 ms timeframe, if the network component initially receives 3 data packets having very relatively high TTB values in a 300 ms time period, and then the network component subsequently receives a data packet having a relatively low TTB value, the network component may be configured to insert the recently received data packet having a lower(est) TTB value near the front of the buffer, and may shift the older data packets having higher TTB value to a different position in the buffer.

At step 436, the computing device may determine whether the TTB value of one or more data packets is less than a threshold value. The computing device may determine a threshold TTB value based on network and/or latency information, such as network and/or latency information retrieved in step 430. In some instances, as discussed above with respect to FIG. 3, the threshold value may indicate an amount of time available to transmit a data packet along a communication path such that the data packet may timely reach an intended destination, such as a network device, client device, or other suitable computing device. In some embodiments, the computing device may receive data from another computing device (e.g., a latency manager) indicating a threshold TTB value. In other embodiments, the computing device may retrieve from memory data indicating a threshold TTB value for one or more data packets buffered at the computing device.

If the TTB value for a data packet received in step 432 is greater than and/or equal to the threshold TTB value, the method may proceed to step 442. If the TTB value for a data packet received in step 432 is less than the threshold TTB value, the method may proceed to step 438, where the computing device may implement network and/or routing policy on a data packet, such as the data packet received in step 432. For example, in some embodiments, the computing device may drop the data packet. As another example, the computing device may transmit to instructions to an originating network component for the data packet. In this example, the computing device may instruct the originating network component to modify the initial TTB value for the data packet.

At step 440, the computing device may generate and/or transmit a communication/message to another computing device regarding a data packet, such as the data packet received in step 432. As discussed above with respect to FIG. 3, the communication may comprise any suitable type of network communication and/or message indicating that a data packet has been dropped by a network component without departing from the scope of the present disclosure, such an ICMP message, timeout message, error message, and the like. In some embodiments, the computing device may transmit network and/or latency information with in the communication to the source network component associated with the data packet.

At step 442, the computing device may determine whether a network communication containing network and/or latency information has been received. As discussed above with reference to FIG. 3 and step 406, a network component may obtain network and/or latency information from other network components via various communications transmitted over the network (e.g., ICMP messages, error messages, and the like), Network components (e.g., network devices, network nodes, routers, etc.) in the communication network may transmit or forward communications (e.g., ICMP messages, error messages, etc.) indicating that a data packet expired and/or was dropped during transit within the network. The communication received in step 442 may include latency, network, and other suitable performance information that may be stored and forwarded to other network components within the communication network. As described above with respect to FIG. 3, the network communication may be forwarded along a reverse communication path back toward the initial network component that generated and/or initially transmitted the data packet.

If the computing device does not receive a network communication, the method may proceed to step 446. If the computing device does receive a network communication, the method may proceed to step 444, where the computing device may store in memory (or any other suitable data storage) information included in a network communication, such as the network communication received in step 442. In some embodiments, the computing device may transfer to another computing device (e.g., latency manager) information included in the network communication. In other embodiments, the computing device may perform one or more of the features identified above with respect to step 408. In some embodiments, the computing device may retrieve various types of data from the network communication, such as time since dropped information (as discussed above with respect to Table 3), communication path data (e.g., the number of hops traversed by the data packet since the packet was dropped), and other types of information.

In other embodiments, the computing device may utilize data retrieved from the network communication to update TTB values for one or more data packets being buffered at the computing device. In some of these embodiments, the computing device may monitor a number of network communications received in step 442, and may retrieve and/or store an identifier for the data packet in step 432 (and/or an application associated with the data packet). In some of these embodiments, the computing device may utilize such information to determine a number of received network communications for one or more data packets and/or network applications.

At step 446, the computing device may retrieve network and/or latency information from another computing device (e.g., latency manager) and/or network component. In some embodiments, the computing device may retrieve network and/or latency information in the form of a network report (e.g., latency report) as described above with respect to FIG. 3. The computing device may be configured to subscribe to a plurality of network reports made available by one or more network components in the communication network. Additionally or alternatively, the computing device may be configured to receive multicast messages containing network information and latency information from one or more network components.

At step 448, the computing device may update and/or adjust the TTB value for one or more data packets at the computing device. In some embodiments, the computing device may update and/or adjust the value of a TTB parameter/field for one or more data packets buffered at the computing device. For example, the computing device may update and/or adjust the value of a TTB parameter/field for one or more data packets based on an expected latency that the packet(s) may receive/endure as the one or more data packets wait in the buffer of the network component before being transmitted. In some of these embodiments, the computing device may update the TTB value for a data packet based on network and/or latency information retrieved in steps 430 and/or 446. In some embodiments where the computing device comprises a latency manager, the computing device may be configured to instruct one or more network components in a communication network to update the TTB value for one or more data packets buffered at a network component. In other embodiments, the computing device may reprioritize one or more buffered data packets in accordance with a routing and/or transmission policy. In some embodiments, the computing device may perform one or more of the features described above with respect to step 416.

At step 450, the computing device may determine whether a data packet buffered at the computing device may be transmitted. In one embodiment, the computing device may identify one or more data packets to be transmitted from the computing device to another computing device and/or network component. In another embodiment, the computing device may determine whether to transmit a data packet (and/or which data packet to transmit) based on a network routing and/or transmission policy executed by the computing device. In some embodiments, the computing device may determine whether to transmit a data packet based on network and/or latency information, such as network and/or latency information obtained in steps 430 and/or 446. In some of these embodiments, the computing may inspect the TTB values of one or more data packets to determine which data packet to transmit. In still other embodiments, the computing device may determine whether to transmit a data packet (and/or which data packet to transmit) based on information received from another computing device (e.g., a latency manager). For example, the computing device may identify one or more data packets to transmit based on network reports received from one or more network components. As another example, the computing device may identify one or more data packets to transmit based on network performance and/or latency data obtained from a latency manager.

If the computing device determines that a data packet does not need to be transmitted, the method may proceed to step 432. If the computing device determines that a data packet may be transmitted, the method may proceed to step

454, where the computing device may determine whether the TTB value for the data packet to be transmitted is less than a parameter value (e.g., time since dropped value) associated with a communication path in which the data packet will be transmitted. As described above with respect to Table 3, the time since dropped value may indicate the amount of time a network communication has taken to traverse a communication path from a first network component (e.g., the network component that dropped a previous data packet) back to a second network component. The time since dropped value may be utilized by a computing device to determine whether one or more buffered data packets have a sufficient TTB value to arrive at an intended destination using a particular communication path. In some embodiments, as discussed above, a computing device (e.g., a network component, a latency manager, etc.) may be configured to identify and/or assess a plurality of potential communication paths that a data packet may take to travel from a first network component to a second network component (e.g., an end point).

At step 454, the computing device may determine a time since dropped value associated with a plurality of the identified potential communication paths, and further, may be configured to compare the TTB value for the data packet to the one or more of the plurality of identified potential communication paths in which to transmit the data packet. For example, if the computing device determines that the TTB value for the data packet to be transmitted is less than the time since dropped value associated with a first communication path in which the data packet may be transmitted, the computing device may determine a second communication path in which to transmit the first data packet. In this example, the computing device may then determine whether the TTB value for the data packet to be transmitted is less than a time since dropped value associated with the second communication path. The computing device may be configured to assess a plurality of communication paths and corresponding time since dropped values to determine a communication path having the capacity to transmit the data packet to an intended destination in a timely manner. As will be discussed in further detail below, in some instances, the computing device may not identify an appropriate communication path in which to transmit the data packet, and instead, may implement (or apply) relevant network policy for the data packet. Accordingly, by comparing the TTB value for the data packet to time since dropped values/parameters associated with a plurality of identified potential communication paths, the computing device can determine whether any potential communication paths in the network has sufficient capacity to successfully transmit the data packet to a desired destination within a timely manner. Further, the computing device may be configured to further determine a communication path that may transmit the data packet to its destination the fastest (e.g., the communication path between the computing device and the desired destination of the data packet that is associated with the lowest/shortest time since dropped value).

If the computing device determines that the TTB value of a data packet (e.g., a data packet identified in step 450) is less than a parameter value (e.g., the time since dropped value) associated with an intended or desired communication path for the data packet, the method may proceed to step 456, where the computing device may implement (or apply) relevant network policy for data packet(s), such as the data packet(s) identified in step 458. In some embodiments, the computing device may perform one or more of the features described above with respect to step 412. For example, in some embodiments, the computing device may drop the data packet. As another example, the computing device may implement one or curative measures as described herein with respect to FIG. 3.

Referring back to step 454, if the computing device determines that the TTB value of a data packet (e.g., a data packet identified in step 450) is greater than/and or equal to the parameter value (e.g., the time since dropped value) associated with the intended or desired communication path for the data packet, the method may proceed to step 458, where the computing device may transmit and/or forward a data packet (e.g., the data packet analyzed in step 454) to another computing device and/or network component. In some embodiments, the computing device may transmit one or more data packets to another computing device and/or network component. After the computing device has transmitted the one or more data packets, such as the data packets identified in step 450 (and/or analyzed in step 454), the method may proceed back to step 432.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:

1. A method comprising:
   receiving, by a first computing device, from a second computing device, and based on sending a request for network latency information, the network latency information;
   receiving, by the first computing device from a first network device, a data packet comprising a time-to-buffer (TTB) value that indicates time remaining for the data packet to reach a destination, wherein the data packet is associated with an application;
   determining, by the first computing device and based on the received network latency information and based on the TTB value, whether the data packet will reach the destination prior to the time remaining reaching zero; and
   causing, based on a determination that the data packet will not reach the destination prior to the time remaining reaching zero, a modification of a priority level of subsequent data packets associated with the application.

2. The method of claim 1, further comprising:
   determining, based on the received network latency information and a TTB value of each data packet in a plurality of data packets, whether each data packet will timely reach the destination; and
   adjusting, based at least in part on the received network latency information, an order in which the plurality of data packets are sent by the first computing device.

3. The method of claim 2, wherein the adjusting the order in which the plurality of data packets are sent further comprises:
   prioritizing a sending of a first data packet of the plurality of data packets based on a time remaining for the first data packet to reach the destination.

4. The method of claim 1, further comprising sending an Internet control message protocol (ICMP) communication indicating an expiration of the TTB value of the data packet.

5. The method of claim 1, wherein the causing the modification of the priority level of subsequent data packets associated with the application comprises:
increasing the priority level of subsequent data packets associated with the application and maintaining a priority level of one or more data packets not associated with the application.

6. The method of claim 1, wherein the determining whether the data packet will reach the destination prior to the time remaining reaching zero further comprises:
determining a period of time the data packet is buffered at the first computing device.

7. The method of claim 1, further comprising:
determining, by the first computing device, a second network device to send the data packet; and
determining, based on the received network latency information, an amount of latency associated with a communication path between the first computing device and the second network device.

8. The method of claim 7, further comprising:
decrementing the TTB value of the data packet in accordance with the determined amount of latency associated with the communication path between the first computing device and the second network device; and
sending the data packet to the second network device.

9. The method of claim 1, further comprising:
determining, based on a determination that an amount of first latency associated with a first communication path between the first computing device and the destination is greater than an amount of second latency associated with a second communication path between the first computing device and the destination, that a second data packet associated with a second TTB value will timely reach the destination via the second communication path and will not timely reach the destination via the first communication path; and
sending, via the second communication path, the second data packet.

10. A method comprising:
receiving, by a second computing device, from a first computing device, and based on sending a request for network latency information, the network latency information associated with a plurality of communication paths of a network;
for each data packet of a plurality of data packets buffered at the second computing device and comprising a time-to-buffer (TTB) value that indicates a time remaining for the data packet to reach a destination, determining, based on the received network latency information and the TTB value, whether the data packet will reach the destination prior to the time remaining reaching zero;
determining, by the second computing device, a first data packet of the plurality of data packets, the first data packet having a lowest TTB value;
determining, based on the received network latency information, an amount of latency associated with a communication path between the second computing device and a first network device; and
sending, by the second computing device, to the first network device, and based at least in part on a determination that the first data packet will reach the destination via the communication path prior to the time remaining reaching zero, the first data packet.

11. The method of claim 10, further comprising:
based on a determination that a second data packet will not reach the destination via the communication path prior to a time remaining, for the second data packet to reach the destination, reaching zero, discarding the second data packet.

12. The method of claim 11, further comprising:
based on the determination that the second data packet will not reach the destination via the communication path prior to the time remaining reaching zero, sending a first network communication to a second network device that previously sent the second data packet to the second computing device.

13. The method of claim 12, wherein the first network communication comprises at least a first parameter indicating an amount of time taken for the first network communication to arrive at the second network device.

14. The method of claim 10, further comprising:
for the plurality of data packets, adjusting a max jitter (MJ) parameter for each data packet in accordance with the received network latency information.

15. The method of claim 14, further comprising:
for each data packet in the plurality of data packets, prioritizing the data packet for sending based at least in part on an identifier for the data packet and the adjusted MJ parameter for the data packet.

16. A method comprising:
determining, by a first computing device, a second computing device to send a first data packet comprising a time-to-buffer (TTB) value that indicates a time remaining for the first data packet to reach a destination;
storing, based on sending a request for an amount of latency associated with a first communication path between the first computing device and the second computing device, the amount of latency in a database;
retrieving, from the database, the amount of latency associated with the first communication path between the first computing device and the second computing device;
determining, by the first computing device, an amount of time the first data packet is buffered at the first computing device;
determining, based on the determined amount of time and the TTB value, whether the first data packet will timely reach the destination via the first communication path; and
causing, based at least in part on a determination that the first data packet will not timely reach the destination via the first communication path, modification of a priority level of subsequent data packet communications.

17. The method of claim 16, further comprising:
based on the determination that the first data packet will not timely reach the destination via the first communication path, discarding the first data packet.

18. The method of claim 16, further comprising:
determining that a second data packet will not timely reach the destination via the first communication path; and
determining a second communication path between the first computing device and the second computing device.

19. The method of claim 18, further comprising:
based on a determination that the second data packet will timely reach the destination via the second communication path, sending the second data packet to the second computing device via the second communication path.

20. The method of claim 16, wherein the causing modification of a priority level of subsequent data packet communications comprises:
   determining a first application associated with the first data packet; and
   increasing the priority level of subsequent data packets associated with the first application by lowering a priority level of one or more data packets not associated with the first application.

21. The method of claim 16, further comprising delaying data packets corresponding to the modified priority level.

22. The method of claim 16, further comprising:
   determining, based on a priority level of the first data packet, to send a first copy and a second copy of the first data packet via different communication paths; and
   based on a determination that the first copy has reached its intended destination, causing the second copy to be discarded.

* * * * *

UNITED STATES PATENT AND TRADEMARK OFFICE
CERTIFICATE OF CORRECTION

| | |
|---|---|
| PATENT NO. | : 11,736,405 B2 |
| APPLICATION NO. | : 15/248834 |
| DATED | : August 22, 2023 |
| INVENTOR(S) | : Gilson et al. |

It is certified that error appears in the above-identified patent and that said Letters Patent is hereby corrected as shown below:

In the Specification

Column 7, Detailed Description, Line 30:
Before "circuit", delete "e"

Column 9, Detailed Description, Line 57:
Delete "throughout)" and insert --throughput)-- therefor Signed and Sealed this
Eighth Day of October, 2024

Katherine Kelly Vidal
*Director of the United States Patent and Trademark Office*